United States Patent
Kanno

(10) Patent No.: US 8,698,350 B2
(45) Date of Patent: Apr. 15, 2014

(54) WIRELESS POWER TRANSMISSION UNIT AND POWER GENERATOR WITH THE WIRELESS POWER TRANSMISSION UNIT

(75) Inventor: Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 13/267,033

(22) Filed: Oct. 6, 2011

(65) Prior Publication Data
US 2012/0086281 A1 Apr. 12, 2012

Related U.S. Application Data

(60) Provisional application No. 61/391,274, filed on Oct. 8, 2010.

(51) Int. Cl.
*H02J 3/38* (2006.01)
(52) U.S. Cl.
USPC .................................. 307/19; 307/18
(58) Field of Classification Search
USPC ....................................... 307/18, 19
See application file for complete search history.

(56) References Cited

U.S. PATENT DOCUMENTS

| 6,008,622 A | 12/1999 | Nakawatase |
| 2008/0278264 A1 | 11/2008 | Karalis et al. |
| 2010/0033156 A1 | 2/2010 | Abe et al. |

FOREIGN PATENT DOCUMENTS

| DE | 11 2006 002 299 T5 | 6/2008 |
| EP | 2 211 438 A1 | 7/2010 |
| JP | 06-096300 A | 4/1994 |
| JP | 08-037121 A | 2/1996 |
| JP | 9-275644 A | 10/1997 |
| JP | 10-014139 A | 1/1998 |
| JP | 11-176676 A | 7/1999 |
| JP | 2002-152997 A | 5/2002 |
| JP | 2004-166323 A | 6/2004 |
| JP | 2006-136045 A | 5/2006 |
| JP | 2010-166693 A | 7/2010 |
| WO | 2009/045847 A2 | 4/2009 |
| WO | 2011/019088 A2 | 2/2011 |

OTHER PUBLICATIONS

International Search Report for corresponding International Application No. PCT/JP2011/005631 mailed Jan. 17, 2012.
Form PCT/ISA/237 for corresponding International Application No. PCT/JP2011/005631 dated Jan. 17, 2012.
Co-Pending U.S. Appl. No. 12/853,351, filed Aug. 10, 2010.
Supplementary European Search Report for corresponding European Application No. EP 11 83 0387 dated Jan. 9, 2013.

*Primary Examiner* — Robert L. Deberadinis
(74) *Attorney, Agent, or Firm* — Renner, Otto, Boisselle & Sklar, LLP

(57) ABSTRACT

A wireless power transmission unit includes oscillators that convert DC energy into RF energy with a frequency f0, power transmitting antennas, and power receiving antennas. Each power transmitting antenna is a series resonant circuit in which a power transmitting inductor and a first capacitor are connected in series. Each power receiving antenna is a parallel resonant circuit in which a power receiving inductor and a second capacitor are connected in parallel. If the oscillator has a voltage step-up ratio Voc, the power transmitting inductor has an inductance L1, the power receiving inductor has an inductance L2, and the power transmitting and power receiving antennas and have a coupling coefficient k, $(L2/L1) \geq 4(k/Voc)^2$ is satisfied. The absolute value of the phase difference θres between the respective resonant magnetic fields of first and second pairs of resonant antennas is set to fall within the range of 90 to 180 degrees.

32 Claims, 23 Drawing Sheets

(a)

(b)

(a)

(b)

(a)

(b)

WIRELESS POWER TRANSMISSION UNIT AND POWER GENERATOR WITH THE WIRELESS POWER TRANSMISSION UNIT

This application claims priority under 35 USC §119(e) to U.S. Provisional Application No. 61/391,274 filed on Oct. 8, 2010, the entire contents of which are incorporated herein by reference.

BACKGROUND OF THE INVENTION

1. Field of the Invention

The present invention relates to a magnetic resonant coupling wireless power transmission unit for transmitting power by non-contact method using magnetic resonant coupling instead of electromagnetic induction or electromagnetic wave propagation. The present invention also relates to a magnetic resonant coupling power generator for raising the voltage of electric energy, which has been generated by a power generating section such as a solar cell, by magnetic resonant coupling wireless power transmission.

2. Description of the Related Art

A solar power generator ordinarily uses a so-called "solar cell module" in which a very large number of solar cells (which will be simply referred to herein as "cells") are arranged inside a metallic frame and connected together. A glass plate is arranged in front of the solar cell module (which will be simply referred to herein as a "module") so that the respective cells operate without being exposed to the air. And by assembling a number of such solar cell modules together, a solar power generator can be established.

Use of such a solar power generator, however, has not been widespread yet because the cost of manufacturing those cells and modules is too high, which is one of the major obstacles to its introduction. On top of that, the cost of establishing such a system by installing those cells and modules is also too high to neglect. Among other things, the higher the altitude of the place of installation, the riskier and the more expensive the installation work will be, which is a serious problem to overcome in order to further popularize the solar power generator. What is more, to introduce a solar power generator into an existing building, it is difficult to install the wiring connecting the solar power generating section outside of the building to electronic devices inside of the building, which is also one of the big problems with conventional solar power generators.

As will be described later, in a conventional solar power generator, the output voltage of each of its cells is so low that a great many solar cells should be connected together to obtain a voltage that is high enough to operate an electronic device. And a decrease in reliability at such a very large number of connection points is a decisive factor in the decline of the long-term reliability of the overall system. In addition, if those modules and cables deteriorate with a long-term use, their replacements should also be installed at such a height. Consequently, the cost of maintenance is also non-negligible.

As a conventional solar power generator that would overcome such problems, a power supply system for supplying energy wirelessly from outside of a building and through the walls of the building has been proposed (see Japanese Patent Application Laid-Open Publication No. 2006-136045 (Embodiment 5 and FIG. 19), for example). Such a power supply system transmits RF (radio frequency) energy through the walls by electromagnetic induction.

On the other hand, United States Patent Application Publication No. 2008/0278264 (FIGS. 15 and 17) discloses a new type of wireless energy transfer system for transferring energy from one of two resonators to the other, and vice versa, through the space between them. The wireless energy transfer system couples the two resonators with each other via the evanescent tail of the oscillation energy of the resonant frequency that is produced in the space surrounding those two resonators, thereby transferring the oscillation energy wirelessly (i.e., by a non-contact method).

The power supply system disclosed in Japanese Patent Application Laid-Open Publication No. 2006-136045, however, cannot overcome the solar power generation device's own problem that the output voltage of each cell is low. In the field of solar power generation, a crystalline silicon based solar cell, which is currently used broadly due to its high energy conversion efficiency, has an output voltage Vc of just about 0.5 V. For example, if the DC output of a solar power generating section needs to be converted into AC power, the operation efficiency of a normal power conditioner is maximized in response to an input voltage of approximately 300 Vdc. That is why to get that conversion done with high efficiency, the output voltage of the solar power generating section should be increased to the vicinity of 300 V by connecting as many as several hundreds of cells together in series. On the other hand, if connected to a three-wire single-phase grid system (with a working voltage of 100 V or 200 V), which is a normal household wiring system, the solar power generating section may have its output voltage increased by a power conditioner as much as 200 fold or more. Considering the decrease in power efficiency to be caused by increasing the voltage that much, it is still preferred that a very large number of cells be connected together in series to increase the output voltage of the solar power generating section as much as possible.

It should be noted that even if the DC voltage is not converted into AC power within such a solar power generation system, a similar problem will also arise. For example, in a DC power supply system that has attracted a lot of attention these days, its working voltage will be either 48 Vdc or within the range of 300 to 400 Vdc. That is why even when solar energy needs to be supplied to a DC power supply system, several tens to several hundreds of solar cells also need to be connected together in series.

However, the greater the number of cells or modules to be connected together in series, the more easily the overall performance of the system will decline due to either so-called "partial shading" (i.e., some of the installation zone goes into the shade) or deterioration in the property of some of those cells or modules to be installed. To overcome such a problem, normally a countermeasure such as introduction of a bypass diode into each module is taken. Such a measure is not preferred because an excessive quantity of heat will be generated or the cost will rise significantly in that case. Meanwhile, even when the voltage needs to be increased using a normal DC/DC converter with a voltage boosting function, it is also difficult to achieve sufficiently efficiently a voltage step-up ratio that is high enough to significantly reduce the number of cells to be connected together in series.

Also, the voltage boosting ability of the wireless energy transfer system disclosed in United States Patent Application Publication No. 2008/0278264 is limited to what should be realized by conventional transformer technology and is not sufficiently effective to overcome those problems to be solved by the present invention.

A preferred embodiment of the present invention is designed so as to overcome the aforementioned problems with conventional systems and it is therefore an object of the present invention to provide a wireless power transmission unit that can increase a low output voltage of a power generating section effectively.

SUMMARY OF THE INVENTION

A wireless power transmission unit according to the present invention includes first and second wireless power transmitting sections, a combining section, and a control section. Each of the first and second wireless power transmitting sections includes: an oscillator, which converts DC energy into RF energy having a frequency f0; a power transmitting antenna, which transmits the RF energy and which includes a first inductor and a first capacitor that are connected together in series to form a series resonant circuit with a resonant frequency fT; and a power receiving antenna, which receives, by coupling a resonant magnetic field, at least a part of the RF energy that has been transmitted by the power transmitting antenna and which includes a second inductor and a second capacitor that are connected in parallel with each other to form a parallel resonant circuit with a resonant frequency fR. The resonant frequencies fT and fR are set to be substantially equal to the frequency f0 of the RF energy. If the oscillator has a voltage step-up ratio Voc, the first inductor has an inductance L1, the second inductor has an inductance L2, and the power transmitting and power receiving antennas have a coupling coefficient k, the first and second wireless power transmitting sections satisfy $(L2/L1) \geq 4(k/Voc)^2$. The combining section combines together RF energies that have been supplied from the respective power receiving antennas of the first and second wireless power transmitting sections and outputs the combined RF energy. And the control section controls the respective oscillators of the first and second wireless power transmitting sections so that the respective phases of the resonant magnetic fields of the first and second wireless power transmitting sections have a phase difference $\theta$res of 90 to 180 degrees therebetween.

A power generator according to the present invention includes first and second power generating units, a combining section, and a control section. Each of the first and second power generating units includes: a power generating section, which outputs DC energy; an oscillator, which converts the DC energy supplied from the power generating section into RF energy having a frequency f0; a power transmitting antenna, which transmits the RF energy and which includes a first inductor and a first capacitor that are connected together in series to form a series resonant circuit with a resonant frequency fT; and a power receiving antenna, which receives, by coupling a resonant magnetic field, at least a part of the RF energy that has been transmitted by the power transmitting antenna and which includes a second inductor and a second capacitor that are connected in parallel with each other to form a parallel resonant circuit with a resonant frequency fR. The resonant frequencies fT and fR are set to be substantially equal to the frequency f0 of the RF energy. If the oscillator has a voltage step-up ratio Voc, the first inductor has an inductance L1, the second inductor has an inductance L2, and the power transmitting and power receiving antennas have a coupling coefficient k, the first and second power generating units satisfy $(L2/L1) \geq 4(k/Voc)^2$. The combining section combines together RF energies that have been supplied from the respective power receiving antennas of the first and second power generating units and outputs the combined RF energy. The control section controls the respective oscillators of the first and second power generating units so that the respective phases of the resonant magnetic fields of the first and second power generating units have a phase difference $\theta$res of 90 to 180 degrees therebetween.

Another power generator according to the present invention includes first and second power generating units, an output section, and a control section. Each of the first and second power generating units includes: a power generating section, which outputs DC energy; an oscillator, which converts the DC energy supplied from the power generating section into RF energy having a frequency f0; a power transmitting antenna, which transmits the RF energy and which includes a first inductor and a first capacitor that are connected together in series to form a series resonant circuit with a resonant frequency fT; a power receiving antenna, which receives, by coupling a resonant magnetic field, at least a part of the RF energy that has been transmitted by the power transmitting antenna and which includes a second inductor and a second capacitor that are connected in parallel with each other to form a parallel resonant circuit with a resonant frequency fR; and a rectifier, which converts the RF energy supplied from the power receiving antenna into DC energy. The resonant frequencies fT and fR are set to be substantially equal to the frequency f0 of the RF energy. If the oscillator has a voltage step-up ratio Voc, the rectifier has a voltage step-up ratio Vrr, the first inductor has an inductance L1, the second inductor has an inductance L2, and the power transmitting and power receiving antennas have a coupling coefficient k, the first and second power transmission units satisfy $(L2/L1) \geq 4(k/(Voc \times Vrr))^2$. The output section combines RF energies that have been received from the respective power transmitting antennas of the first and second power generating units and outputs the combined RF energy. The control section controls the respective oscillators of the first and second power generating units so that the respective phases of the resonant magnetic fields of the first and second power generating units have a phase difference $\theta$res of 90 to 180 degrees therebetween.

Yet another power generator according to the present invention includes N power generating units, where N is an integer that is equal to or greater than four, and a combining section, which combines together the respective outputs of the power generating units in parallel with each other. Each power generating unit includes: a power generating section, which outputs DC energy; an oscillator, which converts the DC energy supplied from the power generating section into RF energy having a frequency f0; a power transmitting antenna, which transmits the RF energy and which includes a first inductor and a first capacitor that are connected together in series to form a series resonant circuit with a resonant frequency fT; and a power receiving antenna, which receives, by coupling a resonant magnetic field, at least a part of the RF energy that has been transmitted by the power transmitting antenna and which includes a second inductor and a second capacitor that are connected in parallel with each other to form a parallel resonant circuit with a resonant frequency fR. The resonant frequencies fT and fR are set to be substantially equal to the frequency f0 of the RF energy. If the oscillator has a voltage step-up ratio Voc, the first inductor has an inductance L1, the second inductor has an inductance L2, and the power transmitting and power receiving antennas have a coupling coefficient k, the power transmission unit satisfies $(L2/L1) \geq 4(k/Voc)^2$. The power generator further includes a control section, which controls the respective oscillators of the power generating units so that the resonant magnetic field in one of two proximate ones of the N power generating units has a phase difference $\theta$res of 90 to 180 degrees from the resonant magnetic field in the other power generating unit.

A wireless power transmission unit according to a preferred embodiment of the present invention can increase the voltage significantly in transmitting power between antennas by using coupling between magnetic resonant fields. Also, a power generator in accordance with a preferred embodiments of the present invention can transmit energy wirelessly (i.e., by a non-contact method). Thus, according to the present invention, the energy generated by a power generating section that is arranged outside of a building can be transferred to an electronic device inside of that building at an increased voltage. Consequently, according to a preferred embodiment of the present invention, the cost of installing the power generator can be reduced and the job of replacing a deteriorated part of the power generating section can be done more easily. In addition, according to a preferred embodiment of the present invention, leakage of unwanted electromagnetic components into the surrounding space, which people would worry about when introducing a wireless power transmission unit, can be reduced as well.

On top of that, according to another preferred embodiment of the present invention, the output voltage of the power generating section can be increased easily. That is why if the power generating section is made up of power generators (e.g., solar cells) with a low output voltage, the number of those power generators to be connected together can be reduced significantly. Consequently, if a solar power generation system is formed by connecting power generators according to a preferred embodiment of the present invention together in parallel, deterioration due to the partial shading can be minimized and power can be supplied with good stability.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 20(a) is a circuit diagram illustrating a half-wave voltage doubler rectifier circuit for use in the power generator as the second preferred embodiment of the present invention, while FIG. 20(b) is a circuit diagram illustrating a full-wave voltage doubler rectifier circuit for also use in the second preferred embodiment.

DETAILED DESCRIPTION OF PREFERRED EMBODIMENTS

Hereinafter, preferred embodiments of a wireless power transmission unit and power generator according to the present invention will be described. First of all, the fundamental configuration of the present invention will be described briefly with reference to FIGS. 1 through 11.

Figure 1:
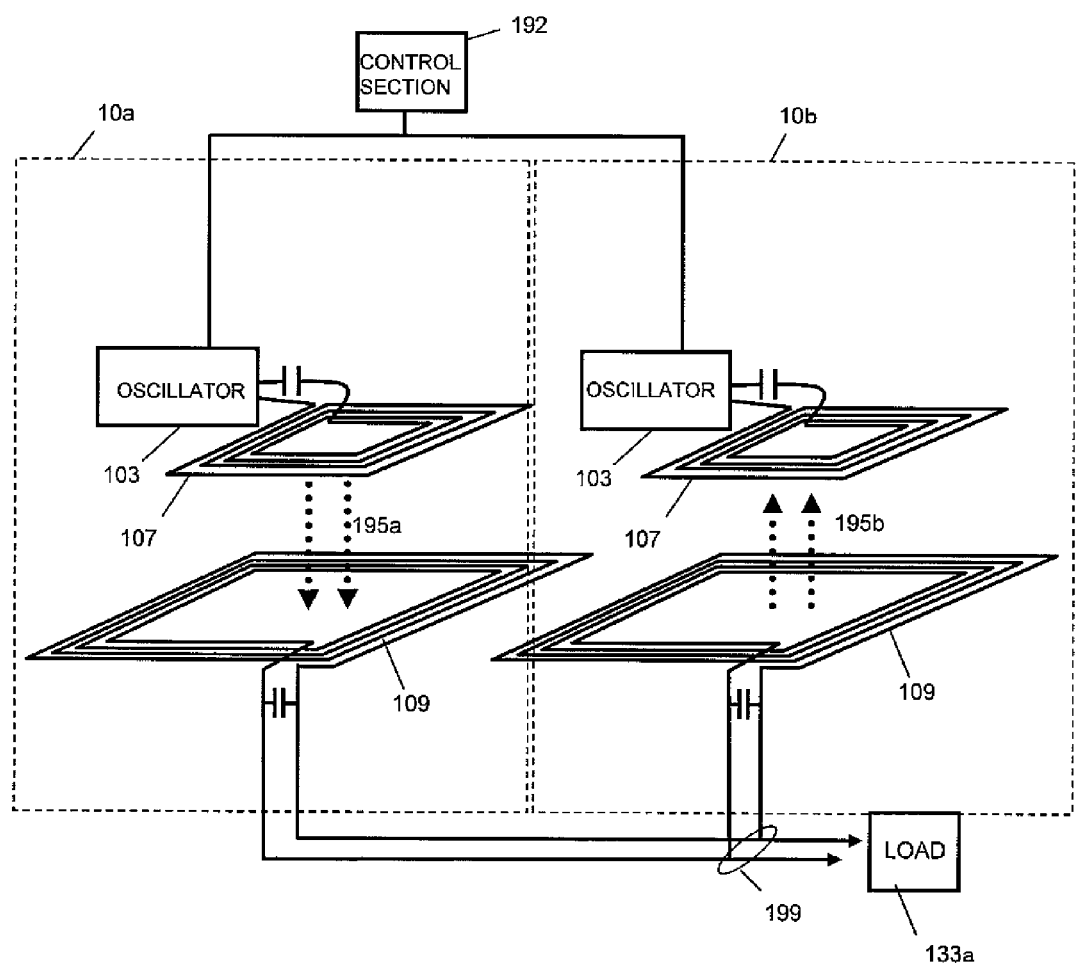
FIG. 1 illustrates a fundamental arrangement for a wireless power transmission unit according to the present invention.
Figure 2:
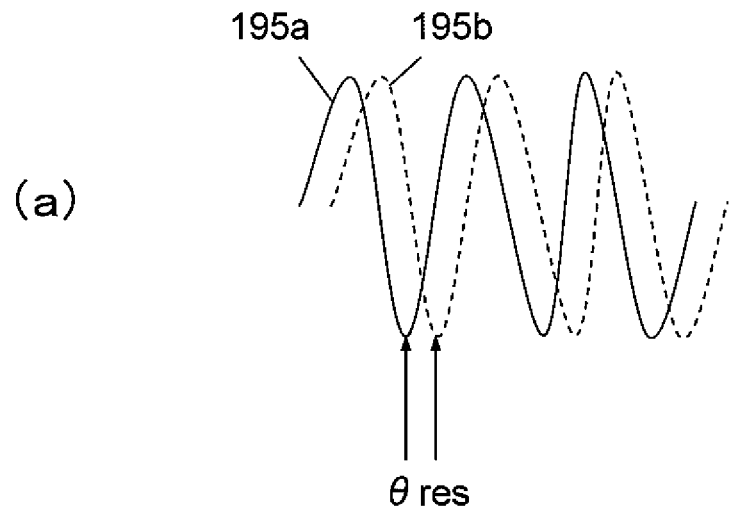
FIGS. 2(a) and 2(b) are waveform diagrams, each of which shows the phases of resonant magnetic fields.
Figure 2:
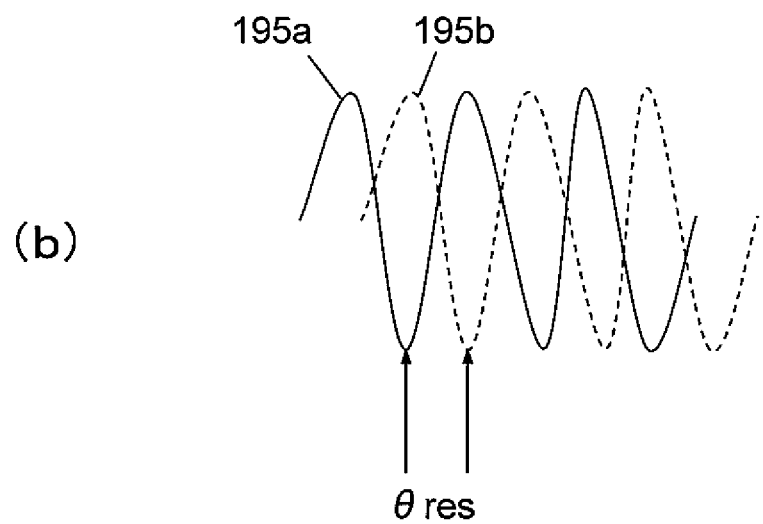

FIG. 1 illustrates a fundamental arrangement for a wireless power transmission unit according to the present invention.

This wireless power transmission unit includes first and second wireless power transmitting sections 10a and 10b, of which the respective outputs are connected in parallel with each other. Each of the first and second wireless power transmitting sections 10a and 10b includes: an oscillator 103, which outputs RF energy having a frequency f0; a power transmitting antenna 107, which transmits the RF energy having the frequency f0 that has been supplied from the oscillator 103; and a power receiving antenna 109, which receives, by coupling a resonant magnetic field, at least a part of the RF energy that has been transmitted by the power transmitting antenna 107.

The respective phases of the RF energies supplied from these oscillators 103 are controlled by a control section 192, which is, for example, a processor such as a CPU (Central Processing Unit). The control section 192 can adjust the difference in phase (i.e., the phase difference) between the respective resonant magnetic fields 195a and 195b of the first and second wireless power transmitting sections 10a and 10b to a predetermined value. In this wireless power transmission unit, the phase difference between the respective resonant magnetic fields 195a and 195b of the first and second wireless power transmitting sections 10a and 10b is set to fall within the range of 90 to 180 degrees.

FIGS. 2(a) and 2(b) are waveform diagrams, each of which schematically shows the phase difference between the resonant magnetic fields 195a and 195b. Specifically, in the example illustrated in FIG. 2(a), the phase difference θres falls within the range of 90 to 180 degrees. On the other hand, FIG. 2(b) shows the waveforms of the resonant magnetic fields 195a and 195b in a situation where the phase difference θres is equal to 180 degrees.

In this description, if the phase difference between two resonant magnetic fields of interest is represented as (360× n+θ) degrees (where n is an integer and θ is a real number that is equal to or greater than zero but less than 360), the smaller one of θ degrees and (360−θ) degrees will be referred to herein as a "phase difference". That is why the maximum value of the phase difference is 180 degrees.

Now let us turn to FIG. 1 again.

As shown in FIG. 1, the two dotted arrows representing the two resonant magnetic fields 195a and 195b point mutually opposite directions, which schematically indicates that their phase difference is 180 degrees.

The control section 192 shown in FIG. 1 includes multiple pulse generators, which generate switching pulses that define exactly when their associated oscillator 103 should start to oscillate, and a control section, which controls the operations of those pulse generators. An exemplary configuration for the control section 192 will be described in detail later.

In the wireless power transmission unit shown in FIG. 1, the first and second wireless power transmitting sections 10a and 10b are arranged in parallel with each other and the respective RF energies that have been received at their respective power receiving antennas 109 are combined together by a combining section 199. As a result, this wireless power transmission system outputs the combined RF energy to a load 133a.

When combined by the combining section 199, those RF energies supplied from the first and second wireless power transmitting sections 10a and 10b preferably have zero phase difference between them. In the example illustrated in FIG. 1, their phases at the combining section 199 are matched to each other by adjusting the transmission line distances (lengths) from the respective power receiving antennas 109 to the combining section 199.

Figure 3:
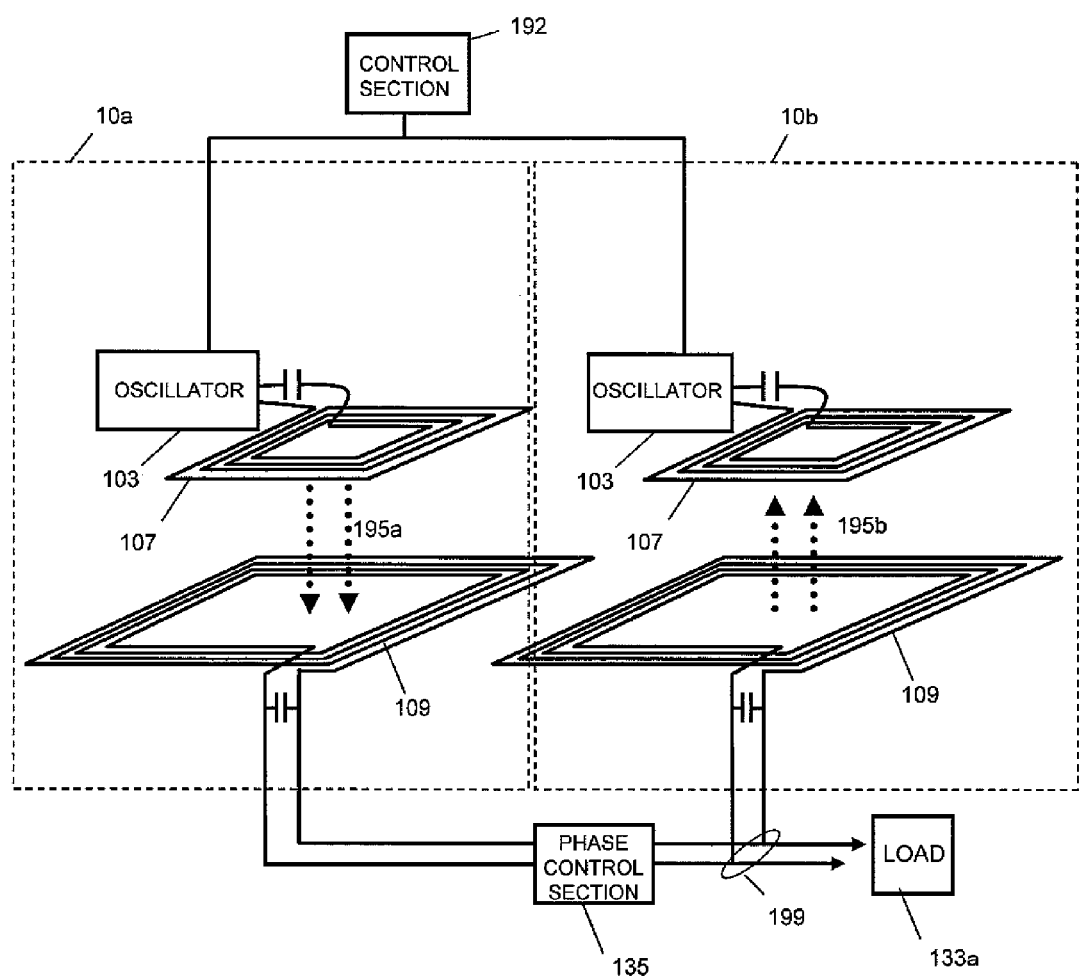
FIG. 3 illustrates another fundamental arrangement for a wireless power transmission unit according to the present invention.

FIG. 3 illustrates a modified example of the wireless power transmission unit shown in FIG. 1. The major difference from the arrangement shown in FIG. 1 is that a phase control section 135 is inserted between the power receiving antennas 109 and the combining section 199. The phase control section 135 includes a circuit that matches the phases of the RF energies supplied from the power receiving antennas 109 of the first and second wireless power transmitting sections 10a and 10b by causing either a phase lead or lag in at least one of those two RF energies before the RF energies are supplied to the combining section 199. Such a circuit may be a reactance adjustor including a capacitor and an inductor, for example.

Figure 4:
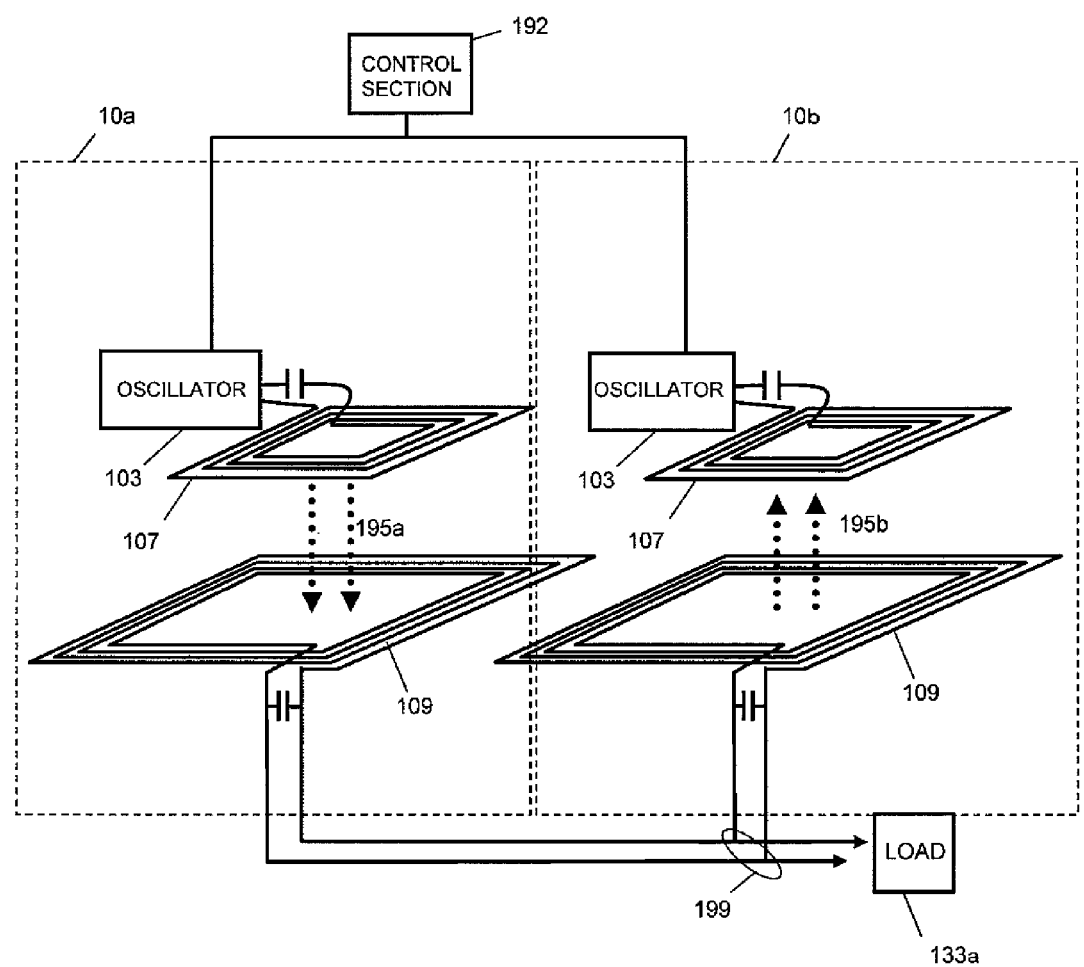
FIG. 4 illustrates still another fundamental arrangement for a wireless power transmission unit according to the present invention.

FIG. 4 illustrates another modified example of the wireless power transmission unit shown in FIG. 1. The major difference from the arrangement shown in FIG. 1 is that the two lines that transmit the RF energies supplied from the first and second wireless power transmitting sections 10a and 10b are connected as two mutually reverse pairs. Generally speaking, when RF energy needs to be transferred through a wired network, two wires need to be combined together to form one transmission line so that when current flows forward through one of those two lines, reverse current should flow through the other line and that those two lines have mutually reverse current phases. That is why if the RF energies supplied from the respective power receiving antennas 109 of the first and second wireless power transmitting sections 10a and 10b have a phase difference of 180 degrees, the combination of polarities of one pair of wires that is connected to the power receiving antenna 109 of the first wireless power transmitting section 10a may be opposite to the combination of polarities of the other pair of wires that is connected to the power receiving antenna 109 of the second wireless power transmitting section 10b. In this manner, the respective phases of the RF energies that have been received by the respective power receiving antennas 109 of the first and second wireless power transmitting sections 10a and 10b can be matched to each other at the combining section 199.

Actually, however, the phase difference between the RF energies supplied from the two power receiving antennas 109 does not have to be exactly 180 degrees. Nevertheless, as long as the distance d between two adjacent power receiving antennas falls within an electrical length range of at most several degrees with respect to the wavelength λ of the transmission frequency, the arrangement shown in FIG. 4 is more advantageous. For example, supposing solar power generating modules are arranged at an interval of 1 m and the transmission frequency is 1 MHz, the wavelength λ at the transmission frequency is 300 m and d corresponds to an electrical length of 1.2 degrees. In that case, the simpler arrangement shown in FIG. 4 is preferred to the arrangement shown in FIG. 3.

It should be noted that the wireless power transmission unit of the present invention does not always have two wireless power transmitting sections but may also have three or more wireless power transmitting sections. However, if there are three or more pairs of power transmitting and power receiving antennas 107 and 109, the oscillation states of their oscillators 103 are preferably controlled so that the phase difference between two proximate ones of those antennas falls within the range of 90 to 180 degrees.

Hereinafter, it will be described with reference to FIGS. 5 and 6 basically how power is transmitted wirelessly between the first and second wireless power transmitting sections 10a and 10b, which have the same fundamental configuration.

Figure 5:
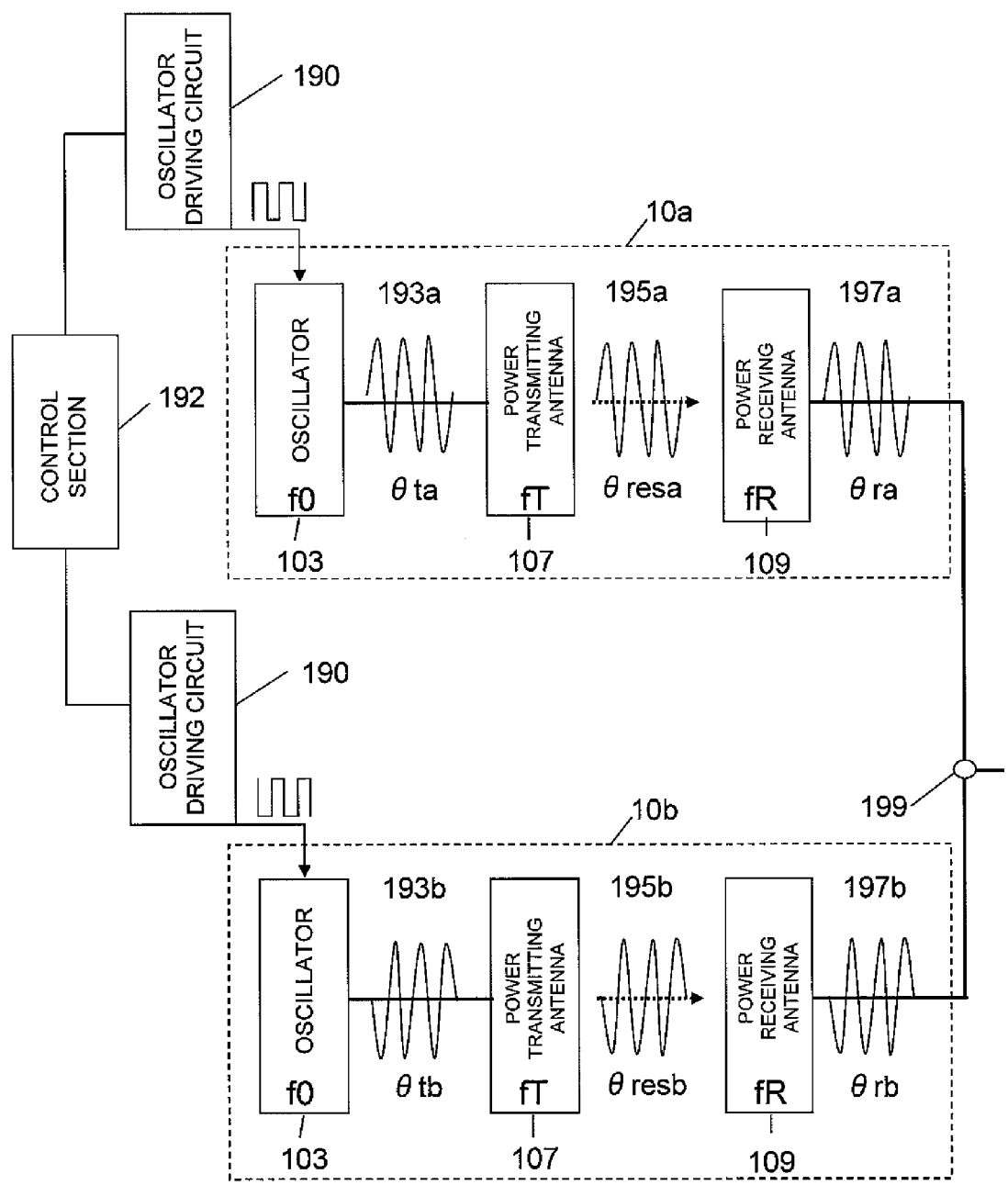
FIG. 5 illustrates a fundamental arrangement for wireless power transmitting sections of the present invention.

First of all, look at FIG. 5, which is a block diagram illustrating an exemplary arrangement for the wireless power transmission unit shown in FIG. 1. Each of the wireless power transmitting sections 10a and 10b includes an oscillator 103 with an oscillation frequency f0, a power transmitting antenna 107 with a resonant frequency fT, and a power receiving antenna 109 with a resonant frequency fR. Both of these resonant frequencies fT and fR are set to be equal to the frequency f0, which may fall within the range of 50 Hz to 300 GHz and preferably falls within the range of 10 kHz to 6 GHz, more preferably within the range of 20 kHz to 20 MHz. According to the intended use, the frequency f0 could also fall within either the range of 20 kHz to 100 kHz or 13.56 MHz or 2.45 GHz.

The oscillator 103 receives DC energy (i.e., power) and converts that DC energy into RF energy having the frequency f0 (which will be referred to herein as a "DC-RF conversion"). The oscillation state of the oscillator 103 is controlled by an oscillator driving circuit 190.

The oscillator driving circuit 190 may be a pulse generator that generates a pulse signal defining exactly when the oscillator 103 should oscillate. The pulse signal supplied from the oscillator driving circuit 190 to the oscillator 103 is an analog signal that typically has a rectangular waveform. And that pulse signal is supplied as a drive signal in order to switch a high power transistor included in the oscillator 103. To prevent the waveform of that drive signal from getting distorted, it is preferred that the oscillator driving circuit 190 and the oscillator 103 be arranged close to each other. Although the oscillator driving circuit 190 and the oscillator 103 are illustrated as two separate circuits in the preferred embodiment shown in FIG. 5, the oscillator driving circuit 190 may form an integral part of the oscillator 103 as well.

The phase of the RF energy output from each oscillator 103 is defined by when the pulse signal is input from the oscillator driving circuit 190. Suppose the phases of the RF energies 193a and 193b supplied from the respective oscillators 103 of the first and second wireless power transmitting sections 10a and 10b are identified by θta and θtb, respectively. Also, suppose the phases of the respective resonant magnetic fields 195a and 195b of the first and second wireless power transmitting sections 10a and 10b are identified by θresa and θresb, respectively. Furthermore, suppose the phases of the RF energies 197a and 197b output by the respective power receiving antennas 109 of the first and second wireless power transmitting sections 10a and 10b are identified by θra and θrb, respectively.

The operations of the two oscillator driving circuits 190 are controlled by the control section 192. Specifically, the control section 192 controls each of these oscillator driving circuits 190 as to exactly when to generate the pulse signal, thereby adjusting the difference between the phases θta and θtb of the respective RF energies 193a and 193b output by the oscillators 103 of the first and second wireless power transmitting sections 10a and 10b to the range of 90 to 180 degrees.

As control signals are preferably exchanged as digital signals between the control section 192 and the multiple oscillator driving circuits 190, the control section 192 may be arranged at a distant location with respect to the oscillator driving circuits 190. Although the control section 192 and the oscillator driving circuits 190 may be connected with each other through cables, it is preferred that the control section 192 and the oscillator driving circuits 190 be connected together wirelessly. In this manner, the control section 192 functions as a synchronization control section for controlling the oscillator driving circuits 190 as to exactly when to input the drive signal to their associated oscillators 103.

The RF energy 193a, 193b is supplied from each oscillator 103 to the power transmitting antenna 107, which is connected to the oscillator 103. The power transmitting and power receiving antennas 107 and 109, which are designed so as to have the same resonant frequency, are coupled together as a circuit by the overlapping resonant magnetic fields produced by their resonators. The power receiving antenna 109 can receive at least a part of the RF energy that has been transmitted by the power transmitting antenna 107. The power receiving antenna 109 is not in contact with the power transmitting antenna 107 but is located at a distance of several millimeters to several meters from the power transmitting antenna 107.

In the wireless power transmission unit of the present invention, the "antenna" is an element for transferring energy from one of two objects to the other by using a coupling phenomenon that has been produced by the evanescent tail of the electromagnetic field of the resonator. According to such a wireless power transmitting technique that uses the resonant electromagnetic field, energy loss, which would otherwise be caused when an electromagnetic wave is transferred to a distant location, will not be caused, and therefore, the power can be transmitted with very high efficiency. Such an energy transmitting technique that uses the coupling phenomenon of a resonant electromagnetic field will cause much less loss than a known non-contact power transmission that uses the Faraday's law of electromagnetic induction. For example, in a preferred embodiment of the present invention, energy can be transmitted between two resonators (or antennas), which have an interval of as long as several meters between them.

To carry out a wireless power transmission based on such a principle, coupling by magnetic resonant coupling needs to be produced between two resonant antennas. As described above, according to the present invention, the resonant frequencies fT and fR are both set equal to the frequency f0 of the oscillator 103. However, fT and fR do not have to be exactly equal to, but may be substantially equal to, f0. That is to say, neither fT nor fR needs to completely agree with f0. To transfer energy with high efficiency by taking advantage of the coupling phenomenon between the two resonators, ideally fT=fR should be satisfied, but there is minimal loss as long as there is only a little difference between fT and fR. Therefore, it is defined in this description that the frequency fT is equal to the frequency fR if the following inequality (1) is satisfied:

$$|fT-fR| \leq fT/QT + fR/QR \quad (1)$$

where QT is the Q factor of the power transmitting antenna as a resonator and QR is the Q factor of the power receiving antenna as a resonator. In general, if the resonant frequency is identified by X and the Q factor of a resonator is identified by Qx, a frequency range in which that resonator produces resonance is obtained by X/Qx. If this inequality $|fT-fR| \leq fT/QT + fR/QR$ is satisfied, energy can be transferred between the two resonators by magnetic resonant coupling.

Figure 6:
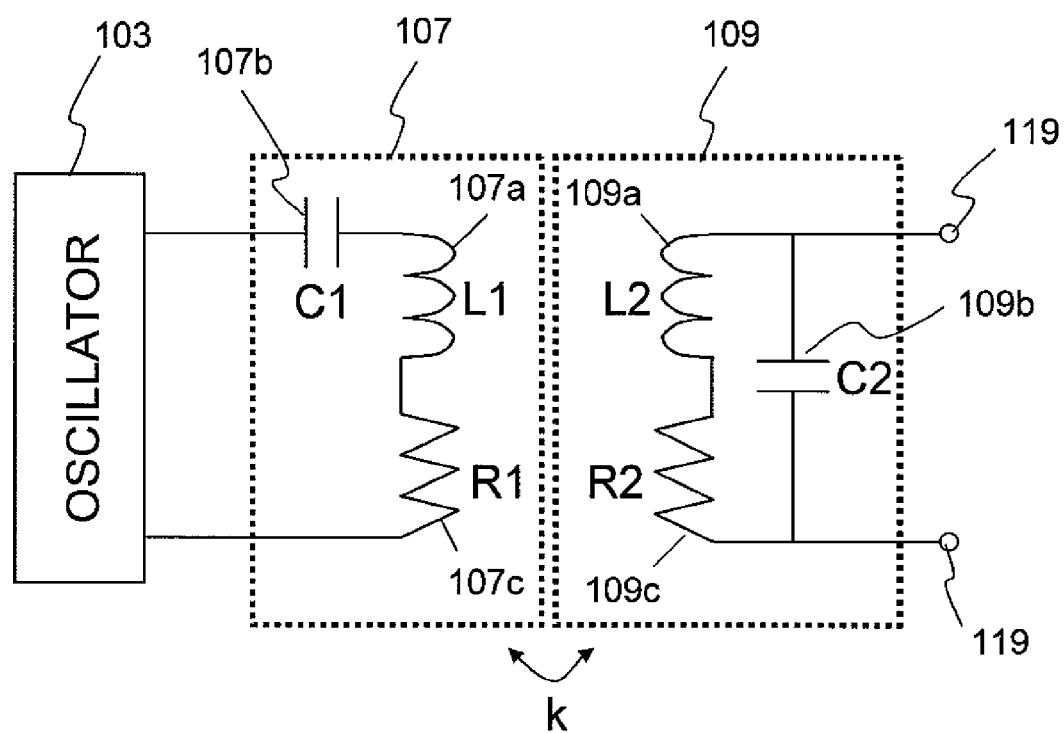
FIG. 6 illustrates an equivalent circuit for antennas in the wireless power transmitting sections of the present invention.

FIG. 6 illustrates an equivalent circuit for the power transmitting and power receiving antennas 107 and 109. As shown in FIG. 6, according to the present invention, the power transmitting antenna 107 is a series resonant circuit in which a power transmitting inductor 107a and a first capacitor 107b are connected together in series, while the power receiving antenna 109 is a parallel resonant circuit in which a power receiving inductor 109a and a second capacitor 109b are connected together in parallel. The series resonant circuit of the power transmitting antenna 107 has a parasitic resistance component R1 and the parallel resonator of the power receiving antenna 109 has a parasitic resistance component R2.

According to the present invention, if Voc represents the voltage step-up ratio of the oscillator 103, L1 and L2 represent the inductances of the power transmitting and power receiving inductors 107a and 109a, respectively, and k represents the coupling coefficient of the power transmitting and power receiving antennas 107 and 109, these L1, L2, k and Voc values are determined so as to satisfy the following inequality:

$$(L2/L1) \geq 4(k/Voc)^2$$

If this relation is satisfied, the voltage of the RF energy output by wireless power transmission can be at least twice as high as that of the DC energy input. That is to say, a voltage step-up ratio of at least two can be achieved. It will be described in detail later exactly why the voltage can be increased that much. In this description, the "voltage step-up ratio" is defined to be a voltage ratio of the energy to be output from one circuit block (or a group of circuit blocks connected together, including that circuit block) in a system to the energy that has been input to that circuit block. For example, when an input DC voltage Vdc is increased to an effective AC voltage Vac, the voltage step-up ratio will be Vac/Vdc. A circuit block represents herein each element such as an oscillator 103, a power transmitting antenna 107, a power receiving antenna 109, a power generating section 101, or a rectifier 115 to be described later.

The wireless power transmission unit of the present invention can increase a low voltage of the given energy (or power) efficiently while the power is being transmitted wirelessly.

Figure 7:
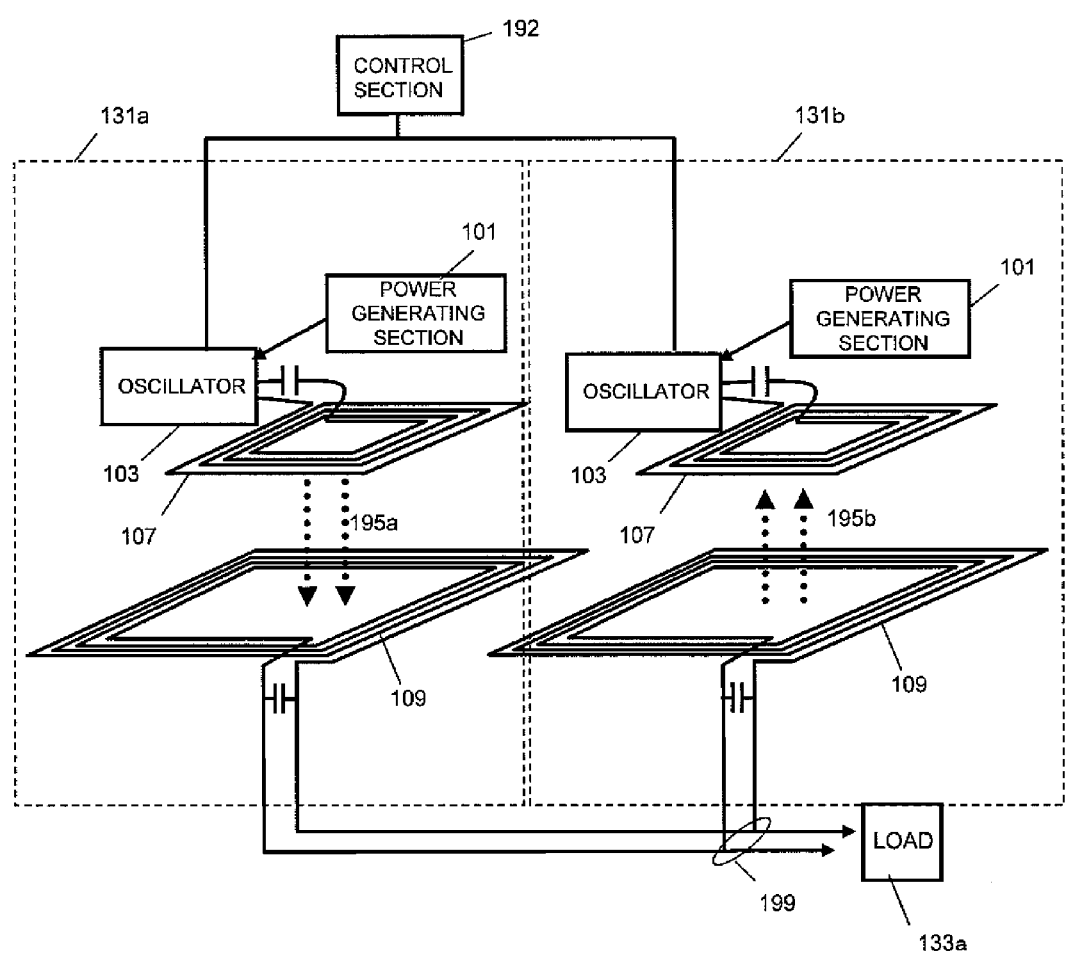
FIG. 7 illustrates a fundamental arrangement for a power generator according to the present invention.
Figure 8:
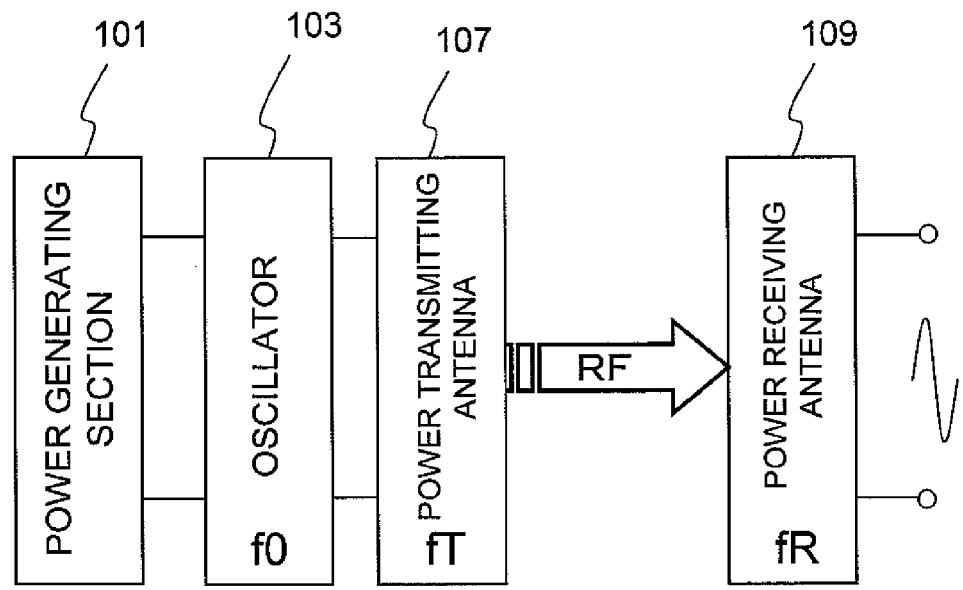
FIG. 8 illustrates an arrangement for a power generating unit according to the present invention.

Next, an exemplary arrangement for a power generator according to the present invention will be described. FIG. 7 is a schematic representation illustrating a power generator according to the present invention. FIG. 8 illustrates a part of the configuration of the power generator of the present invention.

The power generator shown in FIG. 7 includes first and second power generating units 131a and 131b. In this power generator, each power generating unit 131a, 131b includes a power generating section (power generating device) 101 that supplies DC energy to its associated oscillator 103, which is a major difference from the wireless power transmission unit shown in FIG. 1. In the other respects, however, the power generator shown in FIG. 7 has the same configuration as the wireless power transmission unit shown in FIG. 1.

Even if the output voltage of the power generating section 101 is low, the power generator of the present invention can still output power with a high voltage thanks to the voltage increase effect. Consequently, the power generator of the present invention can efficiently increase the voltage of low-voltage energy (or power) that has been generated by a power generating section consisting of solar cells (i.e., a solar power generating section), for example. That is why the number of cells to be connected together in series can be reduced significantly. As a result, a new type of solar power generation system, which can be installed and maintained at lower cost and which will soon get widespread in the near future, is provided.

Figure 9:
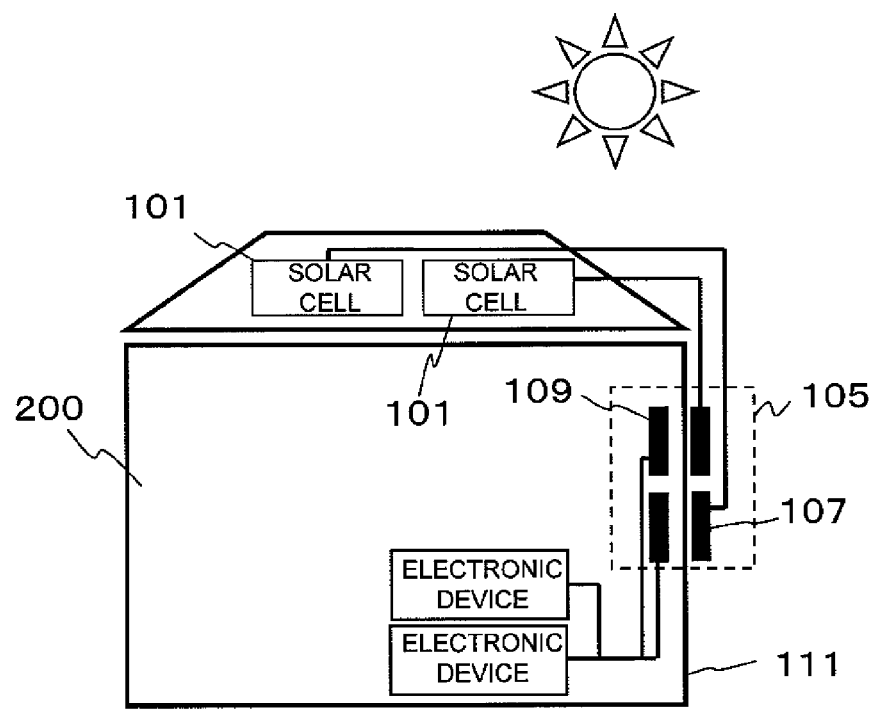
FIG. 9 is a schematic representation illustrating a typical application of a power generator according to the present invention.

FIG. 9 is a schematic representation illustrating a typical application of a power generator including the wireless power transmission unit of the present invention. As shown in FIG. 9, the power generator includes a power generating section 101, which is arranged outside of a building 200 (i.e., outdoors), and a wireless transmission section 105 for transmitting power to electronic devices, which are installed inside of the building 200. In this example, the power generating section 101 generates power using sunlight, and therefore, will sometimes be referred to herein as a "solar power generating section 101". It should be noted, however, that the power generating section of the present invention does not have to be such a solar power generating section.

The solar power generating section 101 includes a number of solar cells that are connected together as power generating devices. The wireless transmission section 105 includes power transmitting and power receiving antennas 107 and 109, which face each other with the wall 111 of the building 200 interposed between them. The power transmitting antenna 107 is connected to the outdoor solar power generating section 101, while the power receiving antenna 109 is connected to the indoor electronic devices. It should be noted that the solar power generating section 101 does not have to be put on the roof but could also be arranged on the wall 111 of this building 200 or installed on any other building as well.

Also, in the example illustrated in FIG. 9, the power receiving antenna 109 is arranged inside of the building 200. However, the power receiving antenna 109 does not have to be arranged at such a location. Alternatively, the pair of resonant antennas, which is formed by the power transmitting antenna 107 and the power receiving antenna 109, may be arranged entirely outside of the building 200 (e.g., on the roof or on the wall of the building 200). In that case, the RF energy that has been received by the power receiving antenna 109 may be transmitted to devices inside of the building 200 either through cables or wirelessly.

The power generating devices that form the power generating section of the present invention do not have to be solar cells but may also be any other type of power generating devices as well. For example, the power generating section may include fuel cells. The voltage increase effect of the present invention will also be achieved significantly in fuel cells because a fuel cell outputs DC energy with a relatively low voltage and is used in conjunction with a high-voltage utility grid.

Figure 10:
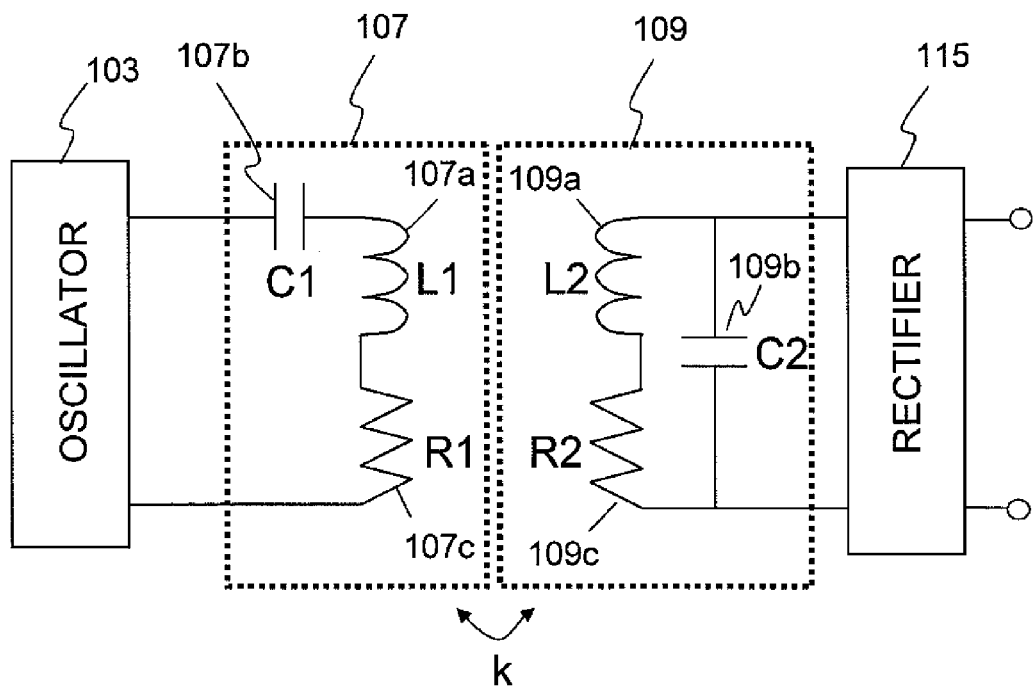
FIG. 10 illustrates a fundamental arrangement for another wireless power transmission unit (with a rectifier) according to the present invention.
Figure 11:
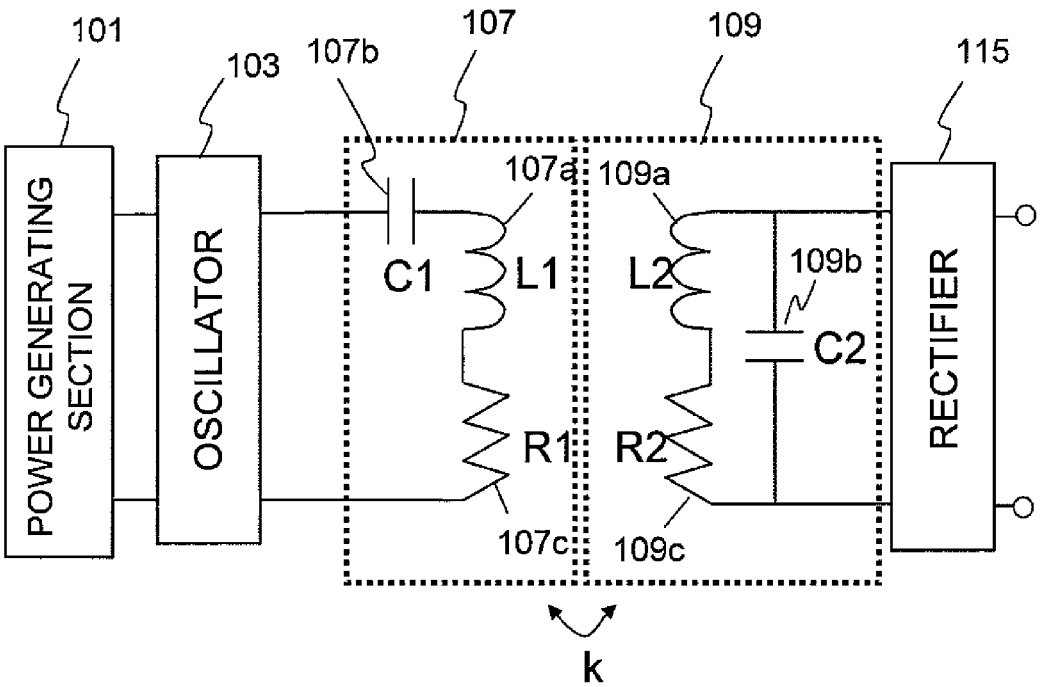
FIG. 11 illustrates a configuration for another power generator (with a rectifier) according to the present invention.

FIG. 10 illustrates another wireless power transmission unit according to the present invention. In addition to every component of the wireless power transmission unit described above (see FIG. 6), this wireless power transmission unit further includes a rectifier 115 that is connected to the power receiving antenna 109. With this rectifier 115, the wireless power transmission unit can output DC energy. FIG. 11 illustrates a part of a power generator according to the present invention including this type of wireless power transmission unit. Even if the power generating section 101 outputs DC energy with a low voltage, the power generator shown in FIG. 11 can still output DC energy after its voltage has been increased sufficiently thanks to the voltage increase effect during the wireless power transmission.

With the rectifier 115 connected to the power receiving antenna 109, the voltage can be at least doubled if the following inequality is satisfied:

$$(L2/L1) \geq 4(k/(Voc \times Vrr))^2$$

where Vrr represents the voltage step-up ratio of the rectifier 115. This point will also be described in detail later.

Optionally, the RF energy received at the power receiving antenna 109 may be converted into AC energy, instead of the DC energy.

Hereinafter, specific preferred embodiments of the present invention will be described with reference to the accompanying drawings.

Embodiment 1

Figure 12:
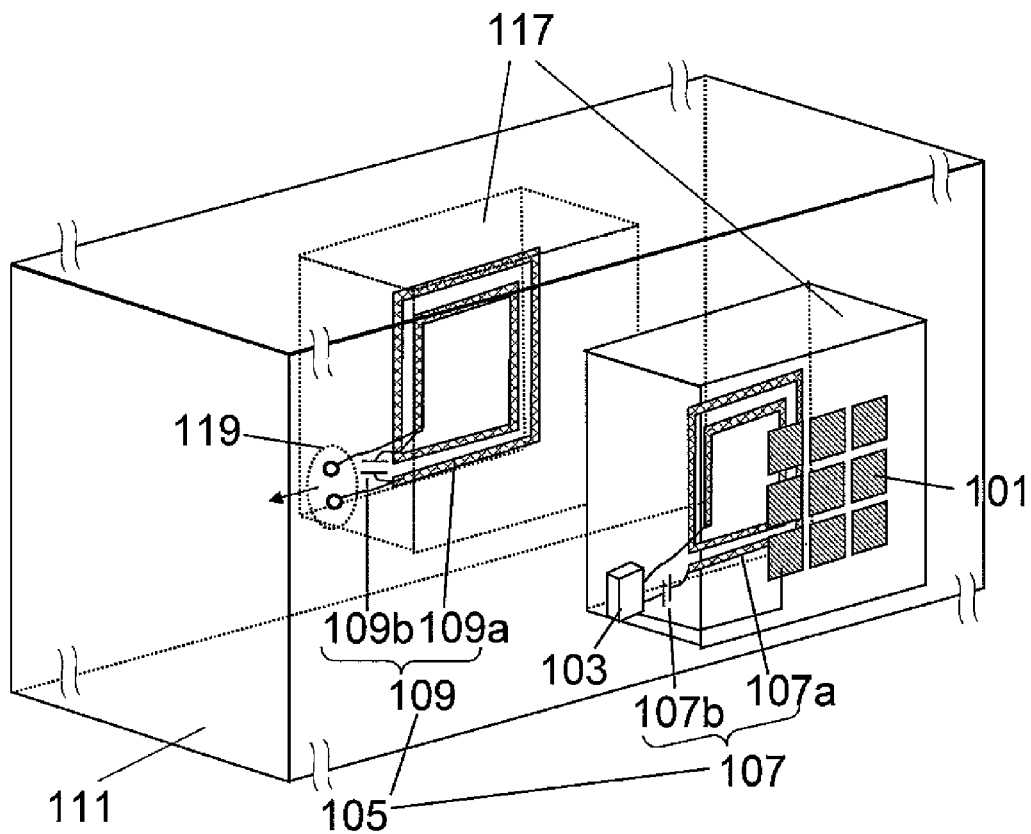
FIG. 12 illustrates a first specific preferred embodiment of a power generator according to the present invention.
Figure 13:
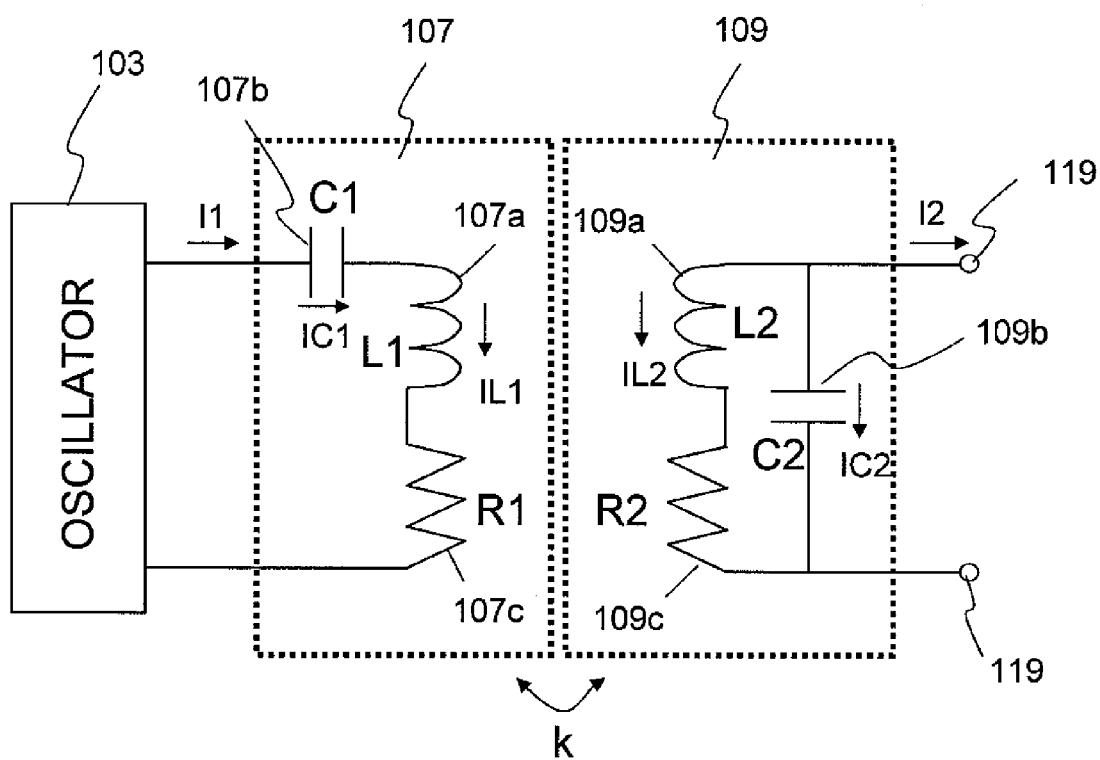
FIG. 13 is an equivalent circuit diagram of the wireless transmission section of the power generator as the first preferred embodiment of the present invention.

First of all, a First Specific Preferred Embodiment of a power generator according to the present invention will be described with reference to FIGS. 12 and 13. Specifically, FIG. 12 is a perspective view schematically illustrating the first preferred embodiment of the present invention and FIG. 13 is an equivalent circuit diagram of the wireless transmission section 105 shown in FIG. 12. In FIGS. 12 and 13, any component having substantially the same function as its counterpart shown in FIGS. 5 and 6 is identified by that counterpart's reference numeral.

As shown in FIG. 7, the power generator of this preferred embodiment includes multiple power generating units, of which the outputs are connected in parallel with each other. Each of the power generating units includes a power generating section 101, an oscillator 103 and a wireless transmission section 105, which are connected together in series as shown in FIG. 12.

In this preferred embodiment, the power generating section 101 includes a number of solar cells (which will be sometimes simply referred to herein as "cells") that are connected together in series. To increase the power generation efficiency as much as possible, the solar cells are preferably crystalline silicon solar power generators. But the solar cells for use in the present invention may also be any of various other types of solar power generators that use a compound semiconductor material such as gallium arsenide or a CIS based material. Or the solar cells may even be any of numerous kinds of solar power generators that use an organic material. If a semiconductor material is used, the crystal structure of the semiconductor may be a single crystalline, polycrystalline or amorphous one. Optionally, a tandem type solar power generator, in which several types of semiconductor materials are stacked one upon the other, may also be used.

As the oscillator 103, a class D, E or F amplifier that would realize high efficiency and low distortion may be used. Or a Doherty amplifier could also be used. Optionally, a sinusoidal wave may be produced with high efficiency by arranging either a low-pass filter or a band pass filter after a switching element that generates an output signal with a distortion component.

The wireless transmission section 105 includes the power transmitting and power receiving antennas 107 and 109. To achieve as high transfer efficiency as possible, the power transmitting and power receiving antennas 107 and 109 are preferably arranged so as to face each other. Nevertheless, the antennas 107 and 109 do not always have to face each other but could be arranged in any other way unless they cross each other at right angles.

The DC energy that has been generated by the power generating section 101 is converted by the oscillator 103 into RF energy with high efficiency. Then, the RF energy is transmitted wirelessly through the space (i.e., the wall 111 in this example) by the wireless transmission section 105 and then output through an output terminal 119.

The power transmitting antenna 107 shown in FIG. 12 is a series resonant circuit having a power transmitting inductor 107a and a first capacitor 107b, while the power receiving antenna 109 is a parallel resonant circuit consisting of a power receiving inductor 109a and a second capacitor 109b. The respective resonant frequencies fT and fR of the power transmitting and power receiving antennas 107 and 109 are set to be approximately equal to the frequency f0 of the RF energy generated by the oscillator 103. Also, in this preferred embodiment, the output impedance Zout of the power receiving antenna 109 is set to be higher than the input DC impedance Zidc of the oscillator 103.

Based on this principle, according to this preferred embodiment, the distance between the power transmitting and power receiving antennas 107 and 109 may be set within the range of several millimeters to several meters, and the energy can still be transferred highly efficiently even if there is the wall 111 between them. Naturally, even if there is no wall 111 between the power transmitting and power receiving antennas 107 and 109 but if there is just an open space between them, the energy can also be transferred by such a non-contact method.

In addition, according to this preferred embodiment, not only can such a non-contact connection be done wirelessly but also the output voltage of the RF energy provided by the power receiving antenna 109 can have been increased sufficiently compared to the input voltage of the incoming RF energy provided to the power transmitting antenna 107.

To reduce multiple reflection of the RF energy between the circuit blocks and to improve the overall power generation efficiency, when the output terminal of the power receiving antenna 109 is connected to a load, the output impedance Zoc of the oscillator 103 is preferably matched to the input impedance Zic of the power transmitting antenna 107. Likewise, when the oscillator 103 is connected to the power transmitting antenna 107, the output impedance Zout of the power receiving antenna 109 is preferably matched to the resistance value R of the connected load.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

Also, the wall 111 does not have to be present between the power transmitting and power receiving antennas 107 and 109 but the power transmitting and power receiving antennas 107 and 109 may face each other with no obstacle put between them. Or even the roof may be interposed between the power transmitting and power receiving antennas 107 and 109.

It should be noted that the power transmitting and power receiving antennas 107 and 109 could be both installed indoors or both arranged outdoors. In either case, the voltage can also be increased while power is being transmitted wirelessly between the two antennas. If both of the power transmitting and power receiving antennas 107 and 109 are installed indoors, then the outdoor solar power generating section 101 may be connected to the power transmitting antenna 107 by way of a cable to be passed through a hole that has been cut through the wall 111 of the building 200. On the other hand, if both of the power transmitting and power receiving antennas 107 and 109 are arranged outdoors, the indoor electronic devices may also be connected to the power receiving antenna 109 by way of a cable to be passed through a hole that has been cut through the wall 111 of the building 200. To eliminate such cable connection between inside and outside of the building, it is preferred that the power transmitting antenna 107 be arranged outdoors and the power receiving antenna 109 be installed indoors as in the example illustrated in FIG. 12.

According to this preferred embodiment, the efficiency of the wireless power transmission depends on the gap between the power transmitting and power receiving antennas 107 and 109 (which will be referred to herein as an "antenna-to-antenna gap") and on the magnitude of loss caused by circuit components that form the power transmitting and power receiving antennas 107 and 109. As used herein, the "antenna-to-antenna gap" substantially means the gap between the two inductors 107a and 109a. The antenna-to-antenna gap can be estimated based on the feature size of the areas occupied by those antennas.

In one preferred embodiment of the present invention, the power transmitting and power receiving inductors 107a and 109a both have the same planar pattern and are arranged so as to face each other and be parallel to each other. As used herein, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides. According to this preferred embodiment, even if the antenna-to-antenna gap is approximately 1.5 times as large as the feature size of the antenna's arrangement area, energy can also be transferred with a wireless transfer efficiency of 90% or more. In addition, the output impedance of the wireless transmission section 105 can be 7832 or more times as high as the input impedance.

In this preferred embodiment, the power transmitting and power receiving inductors 107a and 109a have a spiral structure, of which the numbers of turns are N1 and N2, respectively, where N1>1 and N2>1. However, the power transmitting and power receiving inductors 107a and 109a may also have a loop structure with a number of turns of one. These inductors 107a and 109a do not have to be made of a single-layer conductor pattern but may also be a series connection of multiple conductor patterns that have been stacked one upon the other.

The power transmitting and power receiving inductors 107a and 109a are preferably made of copper, silver or any other conductor with good electrical conductivity. As RF current with RF energy flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, power can be transmitted with even higher efficiency.

To cut down the manufacturing cost, the wiring may be formed at a time by ink printing technique. If necessary, a magnetic body may be arranged near the power transmitting and/or power receiving inductor(s) 107a, 109a. However, the coupling coefficient between the power transmitting and power receiving inductors 107a and 109a should not be set to be an excessively high value. For that reason, it is preferred that inductors with an air-core spiral structure, which can set the coupling coefficient between the inductors 107a and 109a to a moderate value, be used.

Each inductor has typically a coiled shape. However, each inductor does not always have to have such a shape. Since in high-frequency oscillation, a conductor with a certain length of wire has an inductance, it behaves as an inductor. For another example, bead-shaped ferrite in which a conducting wore is arranged also behaves as an inductor.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

To increase their long-term reliability, those components (such as inductors and capacitors) that form the power transmitting and power receiving antennas 107 and 109 are preferably housed in a protective housing 117, which is preferably a waterproof one.

To minimize the transmission loss, the power transmitting and power receiving antennas 107 and 109 are preferably arranged as close to each other as possible. Nevertheless, in order to adjust the voltage step-up ratio to a desired value, their positions inside the protective housing 117 may be changed.

Optionally, the protective housing 117 may be directly fixed on some external member such as the wall 111 or the roof. If a ferromagnetic body and a magnet are provided for the protective housing 117 and the external member, respectively, so that the strength of magnetic coupling between the power transmitting and power receiving antennas 107 and 109 is not affected, then the protective housing 117 can be readily attached to, and removed from, the external member by using magnetic force produced between the ferromagnetic body and the magnet. Alternatively, the protective housing 117 may be attached to, and removed from, the external member by providing a sucker for either the protective housing 117 or the external member.

Next, the voltage increase effect produced by the power generator of the present invention will be described with reference to FIG. 13.

Suppose the power transmitting antenna 107 at the transmitting end and the power receiving antenna 109 at the receiving end are coupled with each other at a coupling coefficient k. By measuring the two resonant frequencies fL and fH to be isolated when two resonators (i.e., the antennas 107 and 109) that produce resonance at the same frequency f0 are arranged close to each other, the coupling coefficient can be derived by the following Equation (2):

$$k=(fH^2-fL^2)/(fH^2+fL^2) \quad (2)$$

The frequency f0 of the oscillator 103 is preferably set to be close to the resonant frequencies fL and fH. More specifically, if the Q factors of the pair of coupled resonators at the resonant frequencies fL and fH are represented by QL and QH, respectively, f0 is preferably set so as to satisfy the following inequality (3):

$$fL-fL/QL \leq f0 \leq fH+fH/QH \quad (3)$$

Also, the mutual inductance M produced between the power transmitting inductor 107a with the inductance L1 and the power receiving inductor 109a with the inductance L2 and the coupling coefficient k satisfy the following Equation (4):

$$M=k \times (L1 \times L2)^{0.5} \quad (4)$$

As is apparent from Equation (4), the coupling coefficient k is identical to the well-known coupling coefficient, which has been used as a parameter representing the strength of coupling between inductors or resonators. The value of the coupling coefficient k satisfies 0<k<1. In the conventional energy transfer by electromagnetic induction, the configuration and arrangement of the pair of inductors are designed to achieve as high a coupling coefficient k as possible (which should be close to one, if possible). In contrast, in a preferred embodiment of the present invention, the coupling coefficient k does not have to be close to one but may be set to be equal to or less than 0.5 as will be described later.

Supposing in the parallel resonant circuit of the power receiving antenna 109, the RF current flowing through the power receiving inductor 109a is identified by IL2 and the RF current flowing through the second capacitor 109b is identified by IC2, the output RF current I2 flowing in the direction shown in FIG. 13 is represented by the following Equation (5):

$$I2=-IL2-IC2 \quad (5)$$

Also, supposing the RF current flowing through the power transmitting inductor 107a is identified by IL1, the following Equation (6) can be derived using the RF current IL2 flowing through the power receiving inductor 109a, the RF current IC2 flowing through the second capacitor 109b, the inductance L2 of the power receiving inductor 109a, the parasitic resistance R2 of the power receiving inductor 109a, the inductance L1 of the power transmitting inductor 107a and the capacitance C2 of the second capacitor 109b:

$$(R2+j\omega L2) \times IL2+j\omega M \times IL1 = IC2/(j\omega C2) \quad (6)$$

Since the resonance condition is satisfied by the power receiving antenna 109, the following Equation (7) is met:

$$\omega L2 = 1/(\omega C2) \quad (7)$$

The following Equation (8) can be derived from Equations (5), (6) and (7):

$$R2 \times IL2 + j\omega M \times IL1 = j\omega L2 \times I2 \quad (8)$$

By modifying this Equation (8), the following Equation (9) is obtained:

$$I2 = k \times (L1/L2)^{0.5} \times IL1 - j(R2/\omega L2) \times IL2 \quad (9)$$

On the other hand, an index Q factor for evaluating the degree of low loss of the resonator of the power transmitting antenna 107 is given by the following Equation (10):

$$Q2 = \omega L2/R2 \quad (10)$$

In this case, if the Q factor of the resonator is very high, approximation that neglects the second term of the right side of Equation (6) is permitted. Thus, the magnitude of the RF current (output current) I2 produced by the power receiving antenna 109 is eventually derived by the following Equation (11):

$$I2 = k \times (L1/L2)^{0.5} \times IL1 \quad (11)$$

In this case, the RF current I2 depends on the RF current I1 supplied to the resonator at the transmitting end (i.e., the power transmitting antenna 107), which will be the RF current IL1 flowing through the power transmitting inductor 107a, the coupling coefficient k between the resonators (antennas), and the inductances L1 and L2 of the power transmitting and power receiving inductors.

As can be seen from Equation (11), the current step-up ratio Ir of the power generator of this preferred embodiment is represented by the following Equation (12):

$$Ir = |I2/I1|/Voc = k/Voc \times (L1/L2)^{0.5} \quad (12)$$

Also, the voltage step-up ratio Vr and the impedance conversion ratio Zr are given by the following Equations (13) and (14), respectively:

$$Vr = (Voc/k) \times (L2/L1)^{0.5} \quad (13)$$

$$Zr = (Voc/k)^2 \times (L2/L1) \quad (14)$$

As can be seen from Equation (13), if $(L2/L1) > (k/Voc)^2$ is satisfied, the voltage step-up ratio Vr is greater than one. Thus, it can be seen that if the coupling coefficient k falls, the voltage step-up ratio Vr rises. According to the conventional energy transfer method by electromagnetic induction, a decrease in coupling coefficient k will lead to a steep decrease in transfer efficiency. According to the magnetic resonant coupling method of the present invention, however, any decrease in coupling coefficient k will never cause such a steep decrease in transfer efficiency. Particularly if the respective Q factors of the resonators that are used as the power transmitting and power receiving antennas 107 and 109 are set to be high values, the decrease in transfer efficiency can be minimized with the voltage step-up ratio Vr increased.

To avoid the influence of partial shading on a solar power generation system, a parallel connection of multiple solar power generating sections is preferred to a series connection of a lot of solar power generating sections. To make a parallel connection of two solar power generating sections realize the same voltage characteristic as what is normally achieved by a series connection of two solar power generating sections, the output voltages of the respective solar power generating sections need to be doubled.

As can be seen from Equation (12), the voltage step-up ratio Vr gets equal to two when $(L2/L1) \geq 4 \times (k/Voc)^2$ is satisfied. Since that relation $(L2/L1) \geq 4 \times (k/Voc)^2$ is satisfied according to the present invention, a voltage step-up ratio Vr of 2 or more can be achieved.

If $(L2/L1) \geq 100 \times (k/Voc)^2$ is satisfied, a voltage step-up ratio Vr of 10 or more is achieved. And if $(L2/L1) \geq 10000 \times (k/Voc)^2$ is satisfied, a voltage step-up ratio Vr of 100 or more is achieved.

It is easy for the power generating section of the present invention to set the k, Voc, L2 and L1 values so as to achieve such a high voltage step-up ratio Vt.

Hereinafter, the effects to be achieved by the wireless power transmission unit of this preferred embodiment will be described in comparison with a conventional wireless power transmission unit.

In the wireless power transmission unit disclosed in United States Patent Application Publication No. 2008/0278264, energy is transferred between two magnetic resonators. However, as that wireless power transmission unit uses the same resonant circuit configuration for the two resonators, the voltage is not increased while the energy is transferred. On the other hand, the increase in output voltage caused by the wireless power transmission unit of the present invention is an effect that has never been achieved by any conventional power transmission unit and that is produced solely by adopting two different resonant structures (i.e., series and parallel magnetic resonant structures) for the power transmitting and power receiving antennas, respectively, and by transferring energy between those two different resonant structures.

It should be noted that a series resonant circuit and a parallel resonant circuit could also be used in a conventional RF telecommunications system such as an RF tag. However, the terminal impedance at the terminal of a probe for use to test the characteristic of an RF block of such an RF telecommunications system and the characteristic impedance of its RF cable are basically set to be 50Ω. That is why at a point of connection with an antenna of such an RF telecommunications system, circuit blocks are normally connected together with the impedance matched to 50Ω in both of its transmitter and receiver.

On the other hand, in the wireless transmission section of the present invention, the input to output impedance conversion ratio Zr is defined to be as high as over 100, or sometimes more than 20000 depending on the conditions, as will be described later for specific examples of the present invention. And that high input to output impedance conversion ratio Zr would never have been imagined to be achievable by the conventional RF telecommunications system.

On top of that, according to the present invention, the longer the distance between the two resonators (or antennas) and the lower the coupling coefficient k, the higher the voltage step-up ratio Vr achieved will be. This is also an effect that would never have been easily expected from the structure and functions of the wireless transmission section for a known telecommunications system.

In a transformer for use in a power circuit, for example, two inductors are arranged close to each other so as to function as a sort of wireless power transmission unit. However, no magnetic resonant coupling is produced between those inductors. Also, such a transformer could achieve the voltage increase effect by increasing the ratio of the number of turns N2 of the power receiving inductor to the number of turns N1 of the power transmitting inductor. However, if the transformer booster has to achieve a voltage step-up ratio of 10 or more, then the number of turns N2 should be increased to be at least ten times as large as the number of turns N1. Such a significant increase in the number of turns N2 would increase the parasitic resistance component R2 in the power receiving inductor proportionally, thus causing a decrease in transfer efficiency after all. In this manner, according to the conventional transformer technology, the voltage can be increased just linearly (or only proportionally) with respect to the number of turns. In contrast, according to the present invention, even if the numbers of turns N1 and N2 are the same, a high Zr can still be achieved.

It should be noted that according to the present invention, there is no need to set the respective inductances L1 and L2 of the power transmitting and power receiving inductors 107a and 109a to be equal to each other. For example, if the inductance L2 is set to be greater than the inductance L1, the voltage step-up ratio V±can be increased.

Figure 14:
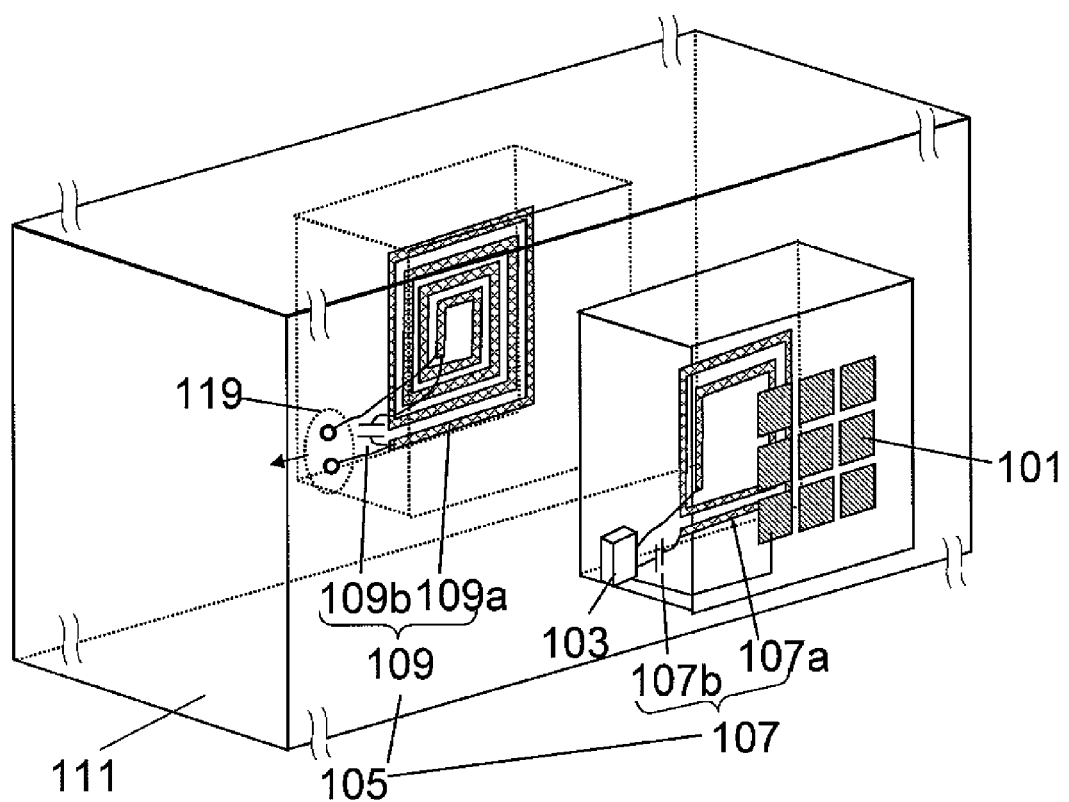
FIG. 14 illustrates a modified example of the first preferred embodiment of the power generator according to the present invention.

FIG. 14 illustrates a preferred embodiment in which to increase the inductance L2 of the power receiving inductor 109a, the number of turns N2 of the power receiving inductor 109a is set to be greater than the number of turns N1 of the power transmitting inductor 107a. If N2/N1 is greater than one, a high voltage step-up ratio can be achieved with smaller loss compared to a situation where the voltage is increased using a known transformer booster.

The inductance L2 can also be greater than the inductance L1 by providing a larger area for the power receiving antenna 109 than the power transmitting antenna 107, instead of setting the N2/N1 ratio to be greater than one (with the N2/N1 ratio kept equal to one).

In the following description, at least the front side of the power transmitting and power receiving inductors 107a and 109a is supposed to have a planar shape and the power transmitting and power receiving inductors 107a and 109a are supposed to be arranged so as not to cross each other at right angles. FIG. 15(a) illustrates the arrangement area 113 of the power receiving antenna 109 that has been projected perpendicularly to the plane on which the power transmitting antenna 107 is arranged. As used herein, the "plane" on which the power transmitting antenna 107 is arranged is defined to be a single plane including the front side of the power transmitting inductor 107a (which will be referred to herein as a "first arrangement plane"). FIG. 15(b) is a cross-sectional view illustrating the arrangement plane 240 of the power transmitting inductor 107a. In the example illustrated in FIG. 15(b), the power transmitting inductor 107a is parallel to its arrangement plane 240. On the other hand, the power receiving antenna's arrangement area is defined herein to be an area that has been projected perpendicularly to the arrangement plane 240 of the power transmitting antenna 107 and that is surrounded with the projected profile of the power receiving inductor 109a.

FIG. 15(a) illustrates the power transmitting inductor 107a that has projected perpendicularly to the arrangement plane of the power transmitting antenna 107. In the example illustrated in FIG. 15(a), the power transmitting inductor 107a that has been projected onto the arrangement plane of the power transmitting antenna 107 is present inside of, and close to an edge of, the arrangement area 113. By adopting such an arrangement, an even higher voltage step-up ratio is achieved.

To control the voltage step-up ratio of the wireless transmission section 105, the shapes and sizes of the antennas may be defined to make an asymmetric combination and the power transmitting antenna may have a bigger size than the power receiving antenna.

Figure 15:
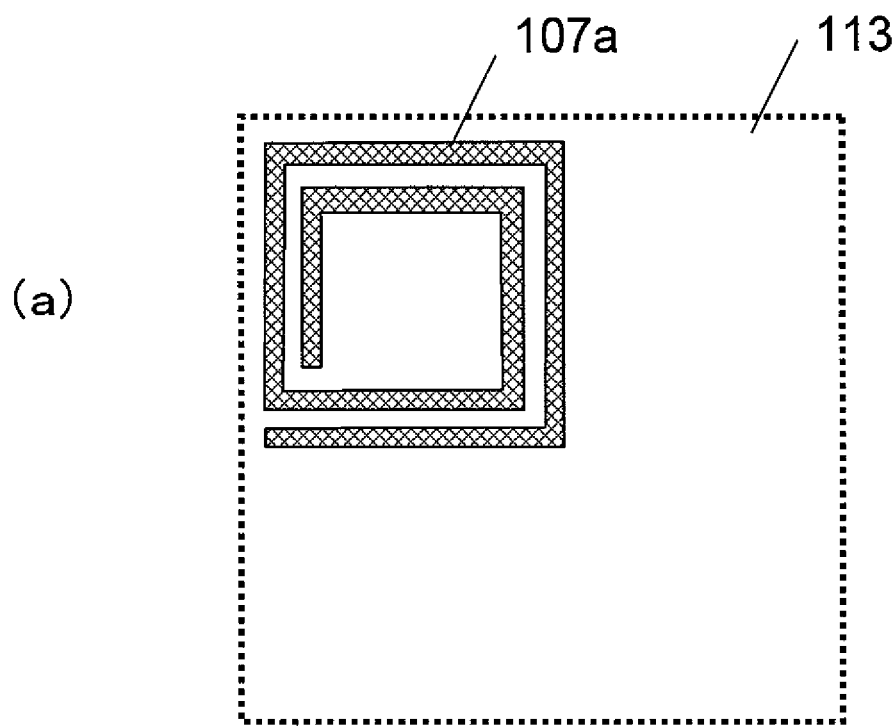
FIG. 15(a) is a plan view illustrating an exemplary arrangement of two inductors and FIG. 15(b) is a schematic cross-sectional view thereof.
Figure 15:
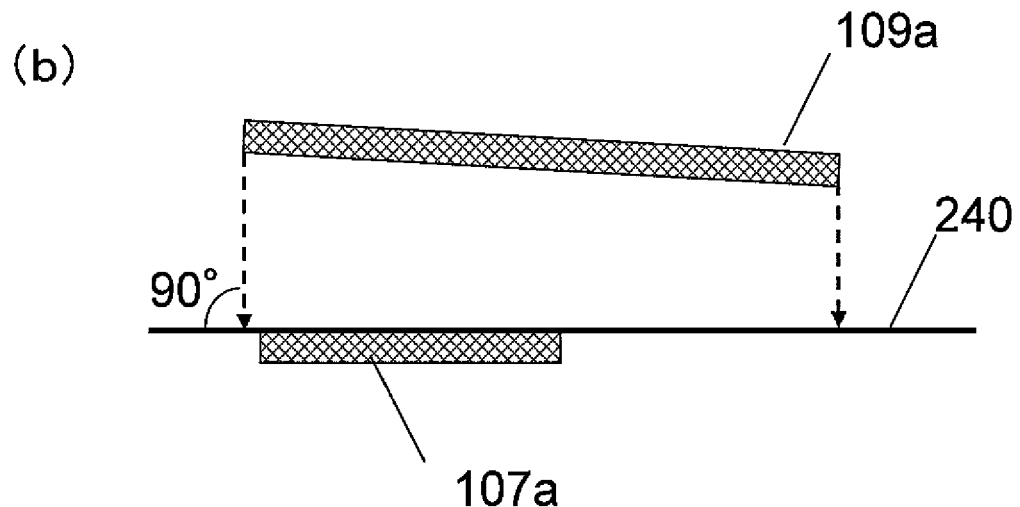

The power transmitting and power receiving antennas 107 and 109 do not have to be arranged as shown in FIG. 15 but may have their positions changed with each other. That is to say, the power transmitting antenna 107 shown in FIG. 15 may be replaced with the power receiving antenna 109 and the arrangement area 113 may be replaced with the arrangement area of the power transmitting antenna 107. In that case, the "arrangement area of the power transmitting antenna 107" refers to the area that has been projected onto the arrangement plane of the power receiving antenna 109 and that is surrounded with the projected profile of the inductor 107a. Also, the "arrangement plane of the power receiving antenna 109" is defined to be a single plane including the front side of the power receiving inductor 109a (which will be referred to herein as a "second arrangement plane"). To achieve sufficiently high transfer efficiency, the first and second arrangement planes are preferably parallel to each other. But those planes do not have to be exactly parallel to each other. It should be noted that the power transmitting and power receiving inductors 107a and 109a do not have to have a planar shape.

Hereinafter, a preferred embodiment of a power generator according to the present invention will be described.

Figure 16:
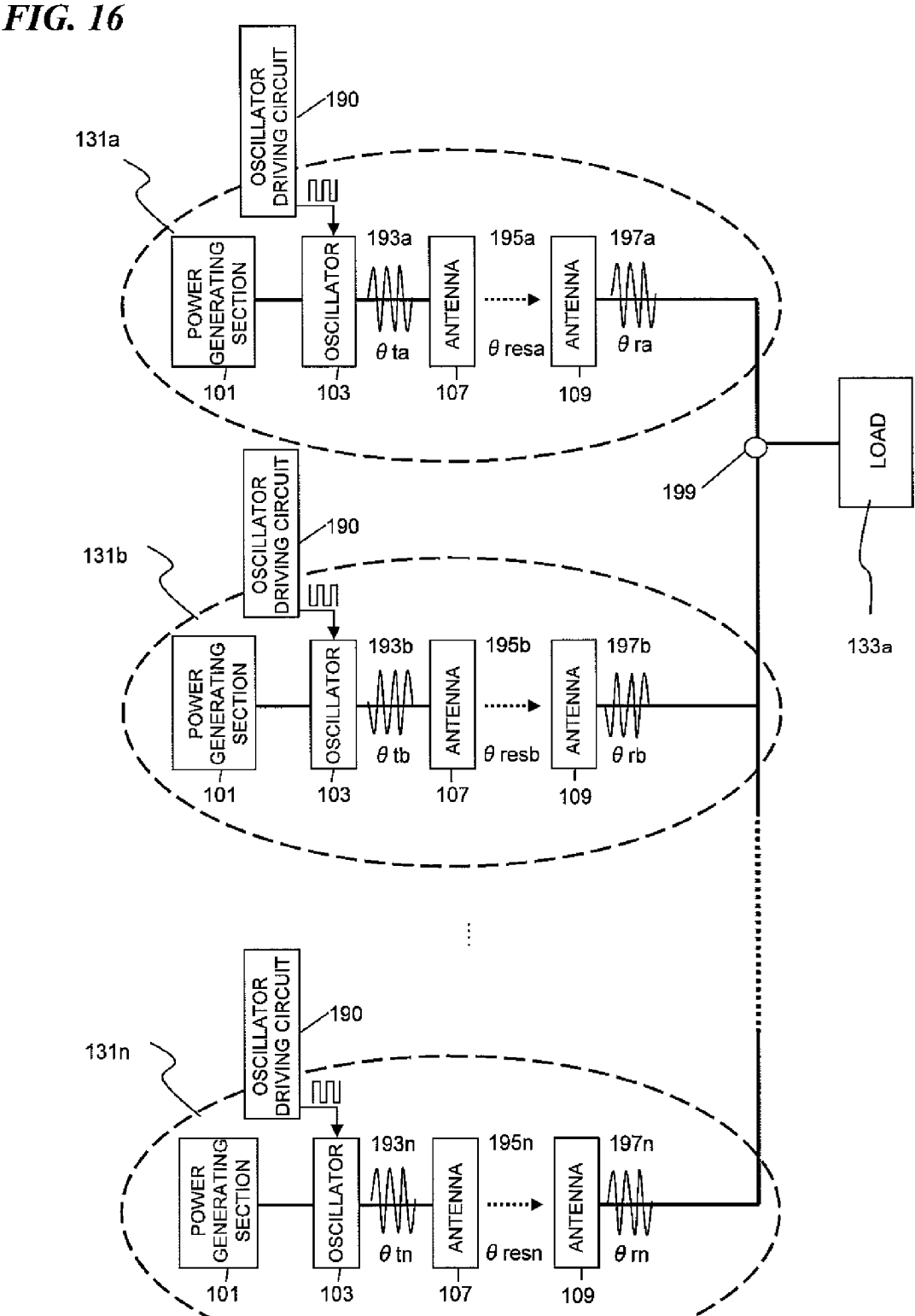
FIG. 16 illustrates a preferred embodiment of a power generator according to the present invention.

First of all, take a look at FIG. 16, which illustrates a preferred embodiment of a power generator according to the present invention that includes a number of power generating units 131a, 131b, and 131n, each including a power generating section 101, an oscillator 103, a power transmitting antenna 107 and power receiving antenna 109. The respective output energies received by those power receiving antennas 109 are combined together in parallel, thereby forming overall output energy. The resonant magnetic field 195, which is generated by each pair of resonant antennas (consisting of the power transmitting and power receiving antennas 107 and 109), is defined so that the absolute value of their phase difference θres (=|θresa−θresb|) falls within the range of 90 to 180 degrees, and preferably becomes equal to 180 degrees, between that pair of adjacent antennas.

In this preferred embodiment, an oscillator driving circuit 190 provided for a first power generating unit 131a controls the phase θeta of the RF energy 193a that has been transmitted by its associated oscillator 103, for example. In the same way, an oscillator driving circuit 190 provided for a second power generating unit 131b controls the phase θtb of the RF energy 193b that has been transmitted by its associated oscillator 103. As already described with reference to FIG. 5, each oscillator driving circuit 190 is connected to the control section 192 (see FIG. 5) either through a cable or wirelessly.

Each of the RF energies 193a and 193b that have been output by the respective oscillators 103 in the first and second power generating units 131a and 131b is RF energy with the same frequency f0. The absolute value of the phase difference θt (=|θta−θtb|) between these RF energies 193a and 193b is controlled as described above. To make θres fall within the range described above, θt is controlled to fall within the range of 90 to 180 degrees, and preferably be equal to 180 degrees.

If the respective power transmitting antennas 107 of these two power generating units 131a and 131b are designed to have the same inductance, the same size and the same number of turns, then θt can be set to be equal to θres. The arrangement that has already been described with reference to FIGS. 3 and 4 is preferably adopted so that the phases θra and θrb of the RF energies 197a and 197b output by the respective power receiving antennas 109 of the first and second power generating units 131a and 131b eventually match to each other.

If the absolute value of the phase difference θres between the resonant magnetic fields 195a and 195b is within the range of 90 to 180 degrees, the vector components of these two resonant magnetic fields 195a and 195b will at least partially cancel each other. As a result, leakage of electromagnetic waves into the surrounding space can be reduced. Also, if θres is equal to 180 degrees, then the two resonant magnetic fields will cancel each other, and therefore, leakage of electromagnetic waves into the surrounding space can be substantially eliminated. This effect can be achieved significantly with respect to a pair of magnetic field sources, which has a wavelength that is much shorter than (which is generally supposed to be at most one-eighth, and preferably one-sixteenth, of) that of the frequency f0. And the shorter the distance between the pair of magnetic field sources, the more significantly the electromagnetic wave leakage can be reduced. That is why if there are three or more pairs of resonant antennas in the power generator of the present invention, the leakage of electromagnetic waves can be reduced much more effectively if θres between two proximate ones of the resonant antennas is set to be equal to or greater than 90 degrees, and preferably be equal to 180 degrees.

Speaking more generally, if there are N (which is an integer that is equal to or greater than four) pairs of resonant antennas in the power generator of the present invention and if N is an even number, θres should be set to fall within the range of 90 to 180 degrees, and preferably be equal to 180 degrees, with respect to N/2 pairs of adjacent resonant antennas, which is a condition for maximizing the effect of reducing the overall amount of leakage of electromagnetic waves from the generator. On the other hand, if N is an odd number, θres should be set to fall within the range of 90 to 180 degrees, and preferably be equal to 180 degrees, with respect to (N−1)/2 pairs of adjacent resonant antennas, which is a condition for maximizing the effect of reducing the overall amount of leakage of electromagnetic waves from the generator.

Figure 17:
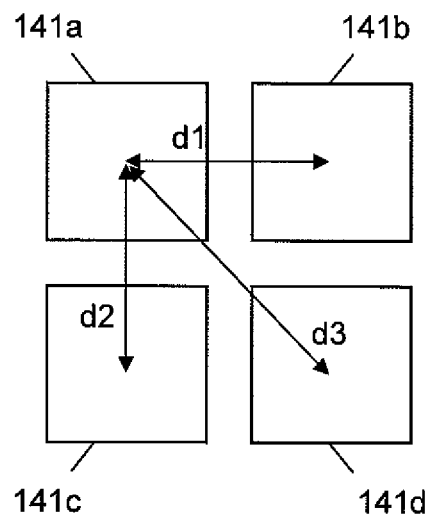
FIG. 17 is a schematic top view illustrating an example of a power generator according to the present invention.
Figure 18:
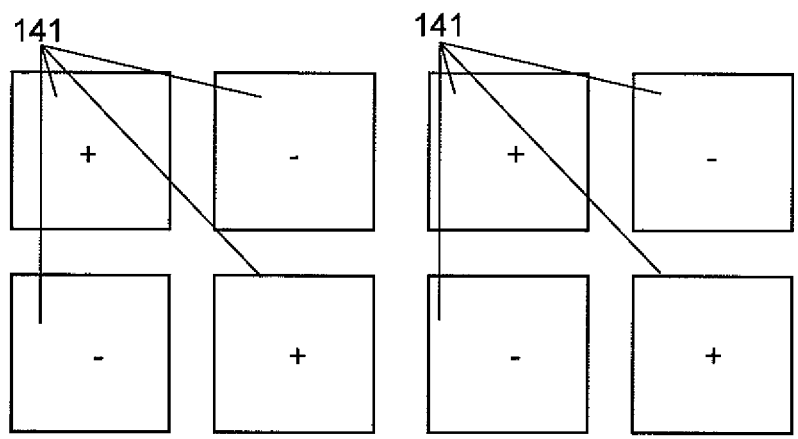
FIG. 18 is a schematic top view illustrating another example of a power generator according to the present invention.

FIG. 17 is a schematic top view illustrating a situation where four pairs of power transmitting and power receiving antennas 141a, 141b, 141c and 141d are arranged in a tetragonal lattice pattern in the power generator of the present invention. In that case, it is preferred that not so much two pairs of power transmitting and power receiving antennas 141a and 141d, of which the center-to-center distance is d3, as two pairs of power transmitting and power receiving antennas 141a and 141b, of which the center-to-center distance is d1 (<d3), and two pairs of power transmitting and power receiving antennas 141a and 141c, of which the center-to-center distance is d2 (<d3), satisfy θres≥90 degrees. This is because the shorter the distance between the magnetic field components to cancel, the more significantly leakage of electromagnetic waves into the surrounding space can be reduced. Consequently, in the power generator of the present invention, the magnetic field suppressing condition (that is 90 degrees≤θres≤180 degrees) is preferably satisfied by two proximate pairs of power transmitting and power receiving antennas as shown in FIG. 18. In FIG. 18, the "+" sign indicates a pair of resonant magnetic fields that have the same phase, while the "−" sign indicates a pair of resonant magnetic fields, of which the phases are different from that of the "+" resonant magnetic fields by 90 to 180 degrees.

Embodiment 2

Figure 19:
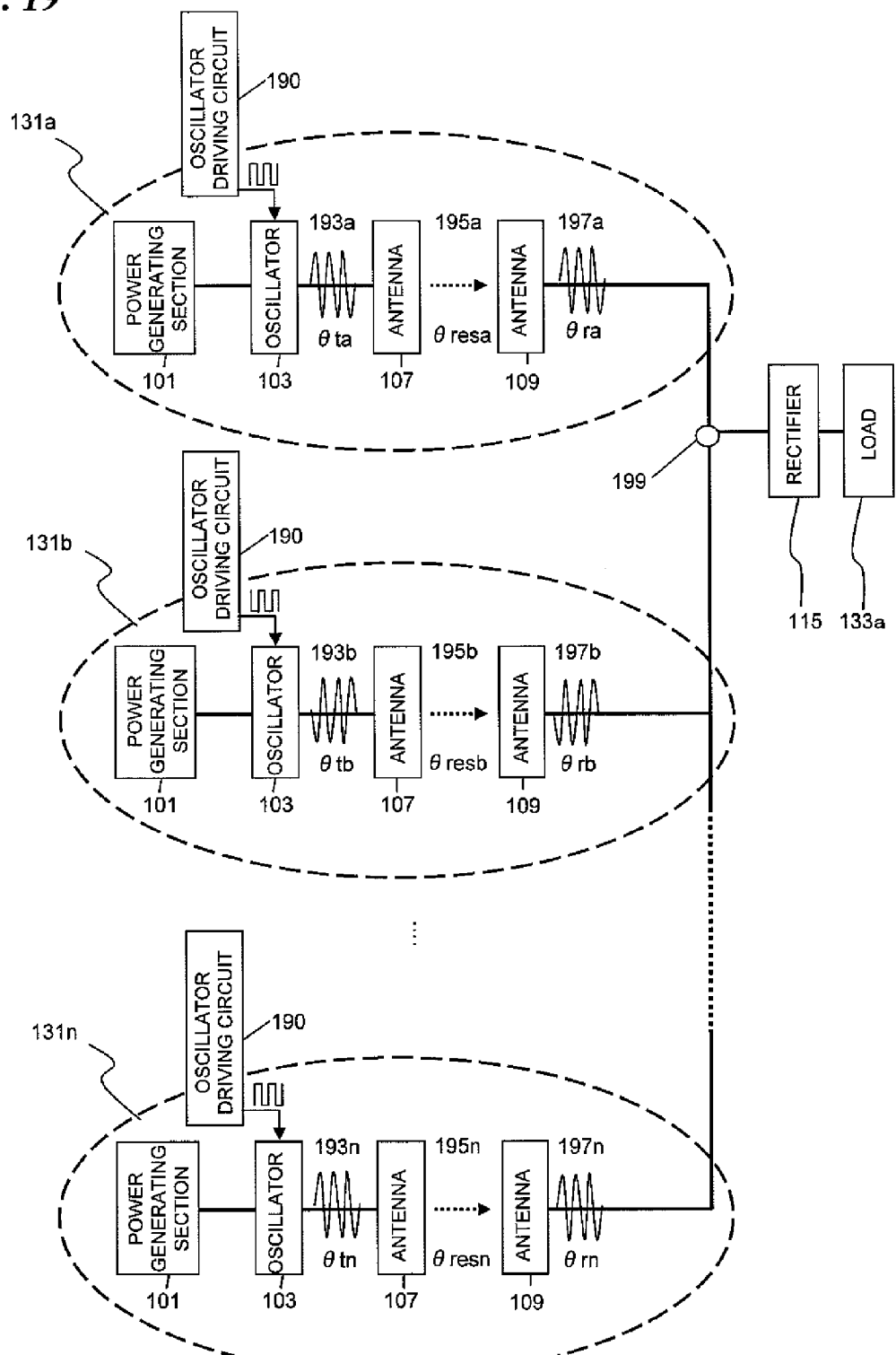
FIG. 19 illustrates a second preferred embodiment of a power generator according to the present invention.

Hereinafter, a second preferred embodiment of a power generator according to the present invention will be described with reference to FIG. 19.

In the power generator of this second preferred embodiment, a rectifier 115 for converting RF energy into DC energy is connected in series so as to follow the combining section 199, which is a primary difference from the power generator of the first preferred embodiment described above. By adopting such a configuration, the energies that have been received by multiple power receiving antennas 109 can be output as DC energy.

The power generator of this preferred embodiment can also achieve the same effects as what is achieved by the counterpart of the first preferred embodiment. In addition, DC power can be obtained as output according to this preferred embodiment.

To reduce multiple reflection of the RF energy between the circuit blocks and to improve the overall power generation efficiency, when the output terminal of the rectifier 115 is connected to a DC load or a DC load system (neither is shown), the output impedance Zoc of the oscillator 103 is preferably substantially matched with the input impedance Zin of the power transmitting antenna 107. Likewise, when the oscillator 103 is connected to the power transmitting antenna 107, the output impedance Zout of the rectifier 115 is preferably substantially matched to the resistance value R of the DC load or the DC load system (not shown).

As the rectifier 115, various types of rectifiers, including full-wave rectifiers and bridge rectifiers, are available. FIG. 20(a) is a circuit diagram illustrating a half-wave voltage doubler rectifier circuit, while FIG. 20(b) is a circuit diagram illustrating a full-wave voltage doubler rectifier circuit. There are other types of high voltage step-up ratio rectifiers that can achieve a voltage step-up ratio of three or more. And any of those various rectifiers may be used in the present invention.

Figure 20:
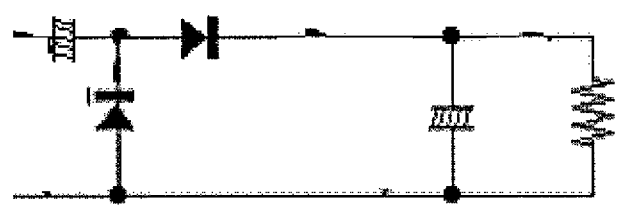
Figure 20:
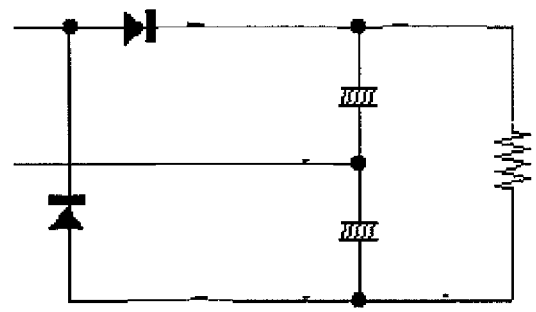

With the voltage doubler rectifier circuit shown in FIG. 20, a DC voltage, which is twice as high as the RF voltage supplied to the rectifier 115, can be output. And by using such a rectifier 115, the voltage that has already been increased by the wireless transmission section 105 can be further raised.

According to this preferred embodiment, the voltage step-up ratio Vr and the impedance conversion ratio Zr that have been derived for the first preferred embodiment are rewritten with the voltage step-up ratio Vrr of the rectifier 115 into the following Equations (15) and (16):

$$Vr = (Voc \times Vrr/k) \times (L2/L1)^{0.5} \quad (15)$$

$$Zr = (Voc \times Vrr/k)^2 \times (L2/L1) \quad (16)$$

According to this preferred embodiment, if the relation $(L2/L1) > (k/(Voc \times Vrr))^2$ is satisfied, the voltage step-up ratio can be greater than one as can be seen from Equation (15).

To achieve a voltage step-up ratio Vr of two or more, $(L2/L1) \geq 4 \times (k/(Voc \times Vrr))^2$ needs to be satisfied. And if $(L2/L1) \geq 100 \times (k/(Voc \times Vrr))^2$ is satisfied, a voltage step-up ratio Vr of 10 or more is achieved.

The power generator of this preferred embodiment realizes a DC power supply system. Currently, a DC power supply system with a working voltage of 24 Vdc is being developed. However, if $(L2/L1) = 2304 \times (k/(Voc \times Vrr))^2$ is satisfied, the voltage can be increased 48-fold from 0.5 V to 24 V. For that reason, if the present invention is applied to a DC power supply system, $(L2/L1) \geq 2304 \times (k/(Voc \times Vrr))^2$ is preferably satisfied. And if $(L2/L1) \geq 10000 \times (k/(Voc \times Vrr))^2$ is satisfied, a voltage step-up ratio Vr of 100 or more is achieved.

Embodiment 3

Figure 21:
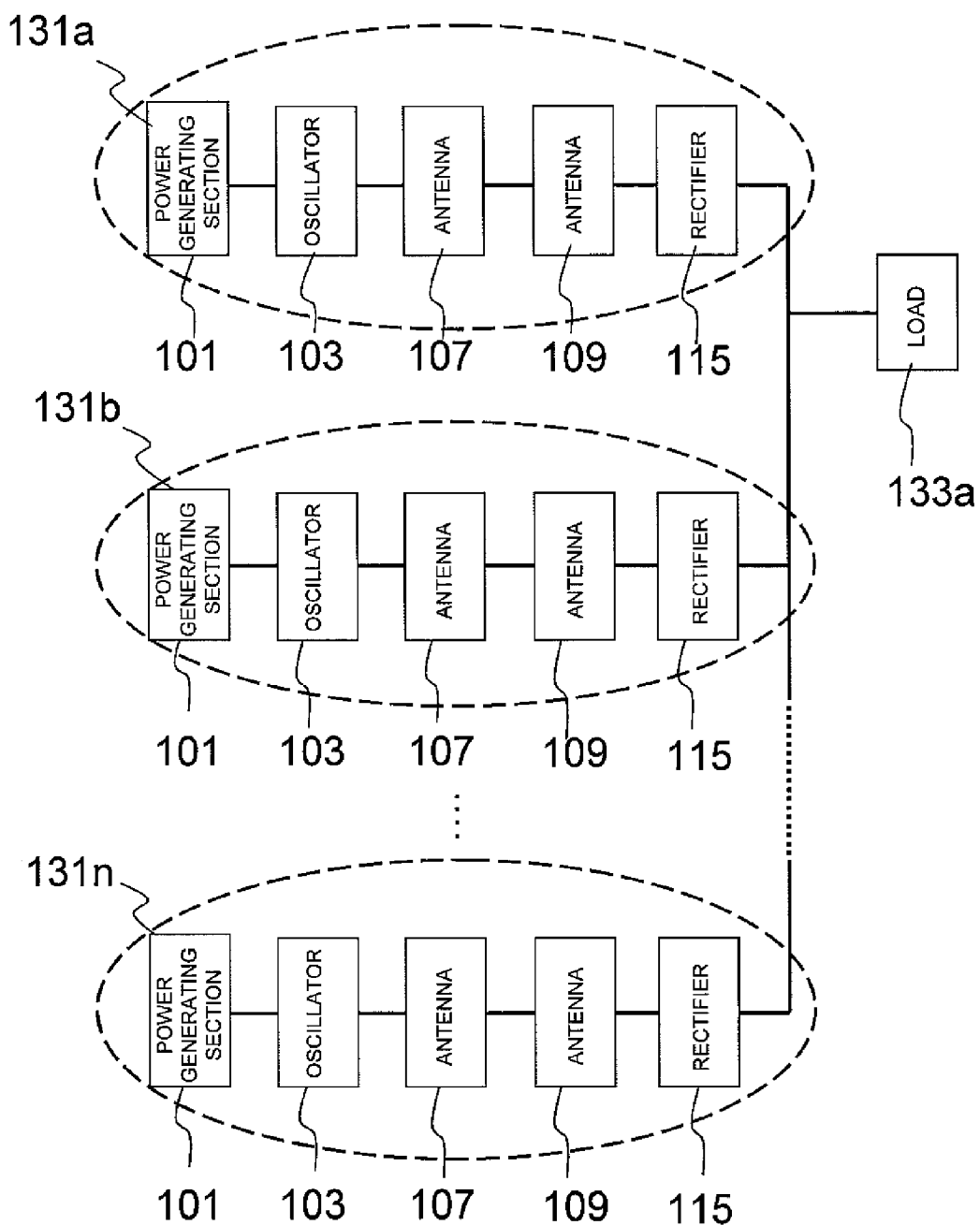
FIG. 21 is a block diagram illustrating another preferred embodiment of a power generator according to the present invention.

Hereinafter, another preferred embodiment of a power generator according to the present invention will be described with reference to FIG. 21, which is a block diagram illustrating a power generator as a third specific preferred embodiment of the present invention. In FIG. 21, any component having substantially the same function as its counterpart of the preferred embodiments described above is identified by that counterpart's reference numeral and a detailed description thereof will be omitted herein to avoid redundancies.

The power generator shown in FIG. 21 includes a number of power generating units 131a, 131b, . . . and 131n that are connected in parallel with each other. In this preferred embodiment, each of these power generating units 131a, 131b, . . . and 131n is the power generator of the second preferred embodiment described above. However, to achieve the effects of the present invention, at least two power generating units that are connected in parallel with each other need to be the power generators of the present invention.

Each of these power generating units 131a through 131n includes a solar power generating section 101, an oscillator 103, power transmitting and power receiving antennas 107, 109 and a rectifier 115, which are connected together in series.

The DC energy that has been generated by the solar power generating section 101 is converted into RF energy by the oscillator 103 with high efficiency. That RF energy is next transferred by non-contact method from the power transmitting antenna 107 at the transmitting end to the power receiving antenna 109 at the receiving end and then converted into DC energy again by the rectifier 115. Thereafter, the DC energies (or powers) that have been output by the respective power generating units 131a through 131n are added together by the parallel connection and then the sum is supplied to a load 133a.

According to this preferred embodiment, the output voltage supplied by each of these power generating units 131a through 131n is much higher than the output voltage of its own solar power generating section. For that reason, even if the power generating units 131a through 131n are connected in parallel with each other, a voltage value that is even closer to the value required by the load 133a can be obtained.

On top of that, since a number of power generating units 131a through 131n are connected in parallel with each other, the performance of this power generator should be more stabilized than the conventional one even if any of those power generating units 131a through 131n deteriorate or if some difference was produced in the condition for irradiating the power generating units 131a through 131n with sunlight.

The load 133a may be a normal electronic device or a storage battery. Also, the load 133a may be an inverter function circuit for converting direct current into alternating current, a voltage step-up/down function circuit, or a power conditioner that has both of the inverter function and the voltage step-up/down function in combination. To match to the impedance of the load 133a, some of the power generating units could be connected together in series in the power generator of this preferred embodiment.

Embodiment 4

Figure 22:
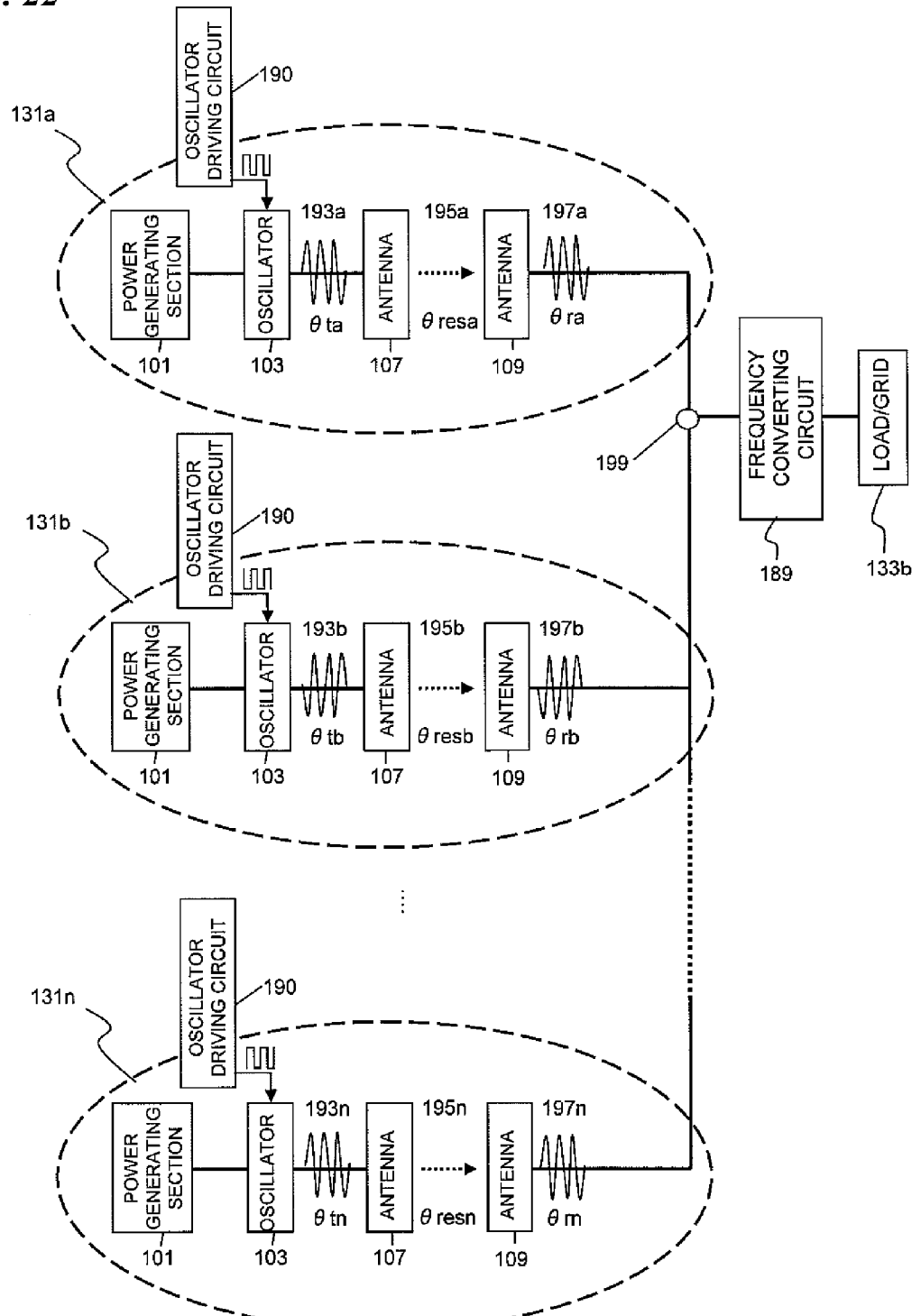
FIG. 22 is a block diagram illustrating another preferred embodiment of a power generator according to the present invention.

Hereinafter, a fourth preferred embodiment of a power generator according to the present invention will be described with reference to FIG. 22.

In the power generator of this fourth preferred embodiment, a frequency converting circuit 189 for converting RF energy into AC energy is connected in series so as to follow the combining section 199 and output, as AC energy, the sum of the energies that have been received at the respective power receiving antennas 109, which is a primary difference from the power generator of the second preferred embodiment described above.

The power generator of this preferred embodiment can also achieve the same effects as what is achieved by the counterpart of the first preferred embodiment. In addition, AC power that can be sent to a load/grid 133b can be obtained as output according to this preferred embodiment. In this description, the load/grid 133b refers to at least one of a load that can be driven with the AC energy and a utility grid that supplies the AC energy as electric power. According to this preferred embodiment, the AC energy can be selectively output to the load or supplied to the utility grid upon a request.

To reduce multiple reflection of the RF energy between the circuit blocks and to improve the overall power generation efficiency, when the output terminal of the frequency converting circuit 189 is connected to an AC load or an AC utility grid system, the output impedance Zoc of the oscillator 103 is preferably substantially matched with the input impedance Zin of the power transmitting antenna 107.

The frequency converting circuit 189 may be any of various types of circuits, examples of which include a circuit that performs a direct frequency conversion such as a matrix converter and a circuit that performs an indirect frequency conversion. The same can be said about the output configuration. That is to say, any of various frequency converting circuit technologies, which process single- and three-phase outputs, for example, is applicable to the present invention.

According to this preferred embodiment, the voltage step-up ratio Vr that has been derived for the first preferred embodiment and the impedance conversion ratio Zr are rewritten with the voltage step-up ratio Vcon of the frequency converting circuit 189 into the following Equations (17) and (18):

$$Vr = (Voc \times Vcon/k) \times (L2/L1)^{0.5} \qquad (17)$$

$$Zr = (Voc \times Vcon/k)^2 \times (L2/L1) \qquad (18)$$

According to this preferred embodiment, if the relation $(L2/L1) > (k/(Voc \times Vcon))^2$ is satisfied, the voltage step-up ratio can be greater than one as can be seen from Equation (17).

To achieve a voltage step-up ratio Vr of two or more, $(L2/L1) \geq 4 \times (k/(Voc \times Vcon))^2$ needs to be satisfied. And if $(L2/L1) \geq 100 \times (k/(Voc \times Vcon))^2$ is satisfied, a voltage step-up ratio Vr of 10 or more is achieved.

The power generator of this preferred embodiment can be a power generator to be connected to a utility grid. If the voltage of the power generating section is Vin, then the output voltage Vout is calculated by $Vout = Vin \times (Voc \times Vcon/k) \times (L2/L1)^{0.5}$. There is a 202 V based system (202 V±20 V) as an exemplary utility grid system. Thus, if $182 \leq Vout \leq 222$ is satisfied, the low-voltage output energy of the power generating section can be connected to a utility grid.

Optionally, the frequency converting circuit 189 may have a voltage step up/down function as well.

Embodiment 5

Figure 23:
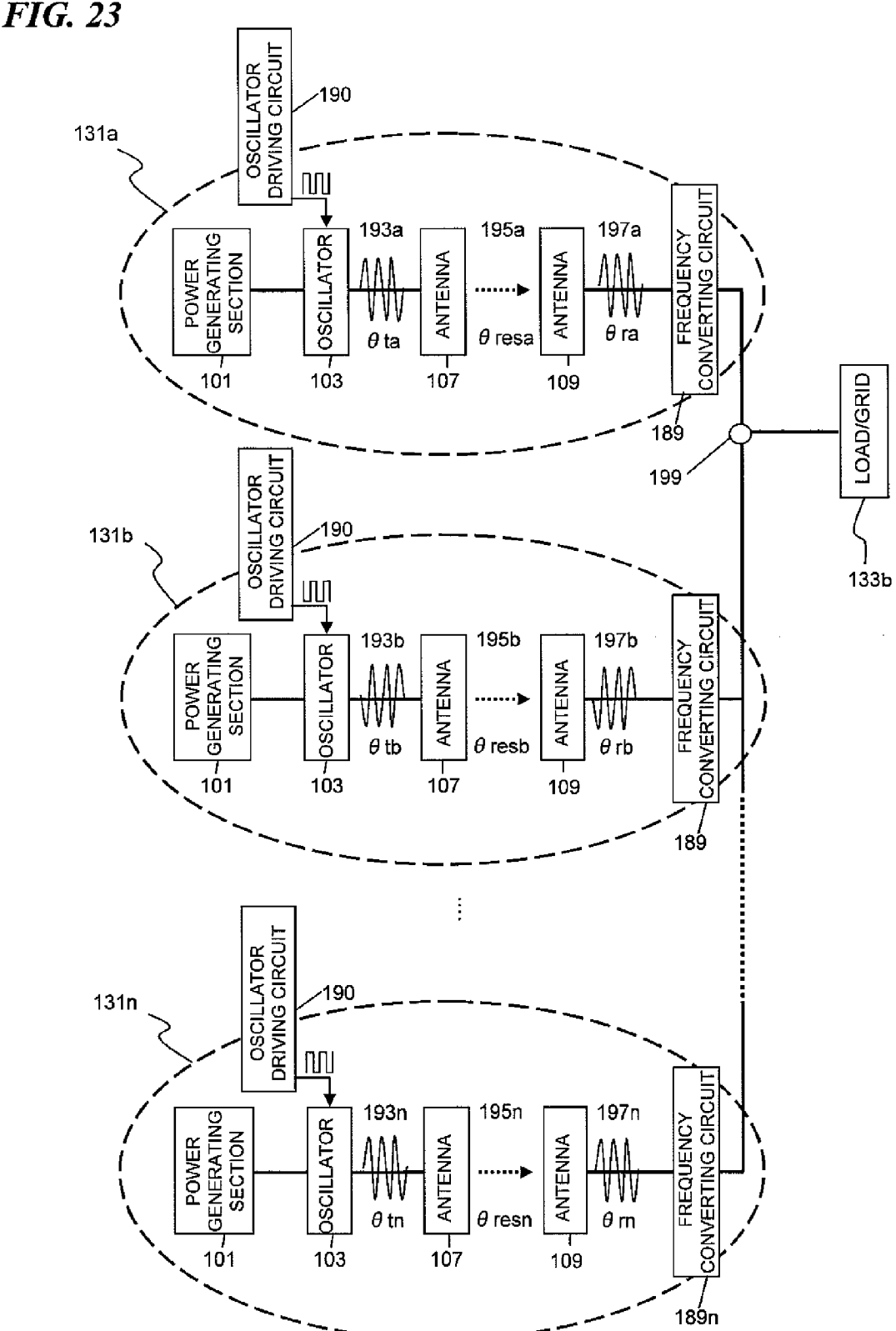
FIG. 23 is a block diagram illustrating another preferred embodiment of a power generator according to the present invention.

Hereinafter, another preferred embodiment of a power generator according to the present invention will be described with reference to FIG. 23, which is a block diagram illustrating a power generator as a fifth specific preferred embodiment of the present invention. In FIG. 23, any component having substantially the same function as its counterpart of the preferred embodiments described above is identified by that counterpart's reference numeral and a detailed description thereof will be omitted herein to avoid redundancies.

The power generator shown in FIG. 23 includes a number of power generating units 131a, 131b, . . . and 131n that are connected in parallel with each other. To achieve the effects of the present invention, at least two power generating units that are connected in parallel with each other need to have the same configuration as the power generator of the present invention.

Each of these power generating units 131a through 131n includes a solar power generating section 101, an oscillator 103, power transmitting and power receiving antennas 107, 109, and a frequency converting circuit 189, which are connected together in series.

The DC energy that has been generated by the solar power generating section 101 is converted into RF energy by the oscillator 103 with high efficiency. That RF energy is next transferred by a non-contact method from the power transmitting antenna 107 at the transmitting end to the power receiving antenna 109 at the receiving end and then converted into AC energy by the frequency converting circuit 189. The AC energies (electric powers) that have been output from the multiple power generating units 131a through 131n are added together by a parallel connection and then the combined energy is supplied to the load 133a.

According to this preferred embodiment, the output voltage supplied by each of these power generating units 131a through 131n is much higher than the output voltage of its own solar power generating section. For that reason, even if the power generating units 131a through 131n are connected in parallel with each other, a voltage value that is even closer to the value required by the load 133a can be obtained.

On top of that, since a number of power generating units 131a through 131n are connected in parallel with each other, the performance of this power generator should be more stabilized than the conventional one even if any of those power generating units 131a through 131n deteriorates or if some difference was produced in the condition for irradiating the power generating units 131a through 131n with sunlight.

The load/grid 133b may be a normal electronic device or a storage battery that can accept AC input, and may include a voltage step up/down function circuit. To match to the impedance of the load/grid 133b, some of the power generating units could be connected together in series in the power generator of this preferred embodiment.

EXAMPLES

Example 1

In the power generator of the present invention, a number of power generating units are connected in parallel with each other, and each of those power generating units can increase the voltage through wireless power transmission. Thus, specific examples of a single power generating unit according to the present invention will be described first. And then specific examples of a power generator, including multiple power generating units of the present invention, will be described.

Hereinafter, a first specific example of the present invention will be described.

First of all, nine single-crystal silicon based solar power generating elements (i.e., solar cells), of which the photosensitive plane had a square surface with a size of 12 cm each side, were connected together in series to obtain a solar power generating section with an output voltage of 4.5 V, an output current of 1 A, and an output impedance of 4.5Ω. And an oscillator with an output frequency of 3 MHz and an output impedance Zoc of 5Ω was connected to the output terminal of that solar power generating section. The oscillator, which was implemented as a class F amplifier, achieved an efficiency of 95%. In this first specific example, the oscillator has a voltage step-up ratio Zoc of 1.05.

The power transmitting and power receiving antennas were designed so as to have a resonant frequency of 3 MHz, which was equal to the output frequency of the oscillator. Specifically, the power transmitting antenna was fabricated by connecting a power transmitting inductor with an inductance of 1.988 µH and a first capacitor with a capacitance of 830 pF in series together. On the other hand, the power receiving antenna was fabricated by connecting a power receiving inductor with an inductance of 1.988 µH and a second capacitor with a capacitance of 830 pF in parallel with each other. Each of the power transmitting and power receiving inductors was a Litz wire that had been formed by arranging multiple sets of 30 copper wires, each having a diameter of 80 µm, in parallel with each other so that those sets were electrically insulated from each other. The two inductors both had a square shape with a size of 36 cm each side and their number of turns was two. Each antenna (or resonator) had a Q factor of 1350.

The power transmitting and power receiving antennas were arranged so that their front sides faced each other and were parallel to each other with a gap of g (cm) left between them. And with that gap g varied within the range of 5 cm through 75 cm, the best input and output impedances Zin and Zout that would maximize the wireless transfer efficiency between the resonators with respect to each g value were looked for. The actual measurements were carried out in the following two steps:

First of all, the RF characteristic between the input and output terminals of the two antennas (or resonators) was measured with a network analyzer with a terminal impedance of 50Ω, thereby obtaining measurement data with a reference impedance of 50Ω.

Next, based on the measurement data thus collected, the impedance conditions Zin and Zout for the input and output terminals that would minimize signal reflection at the terminals were derived by making circuit simulations.

Figure 24:
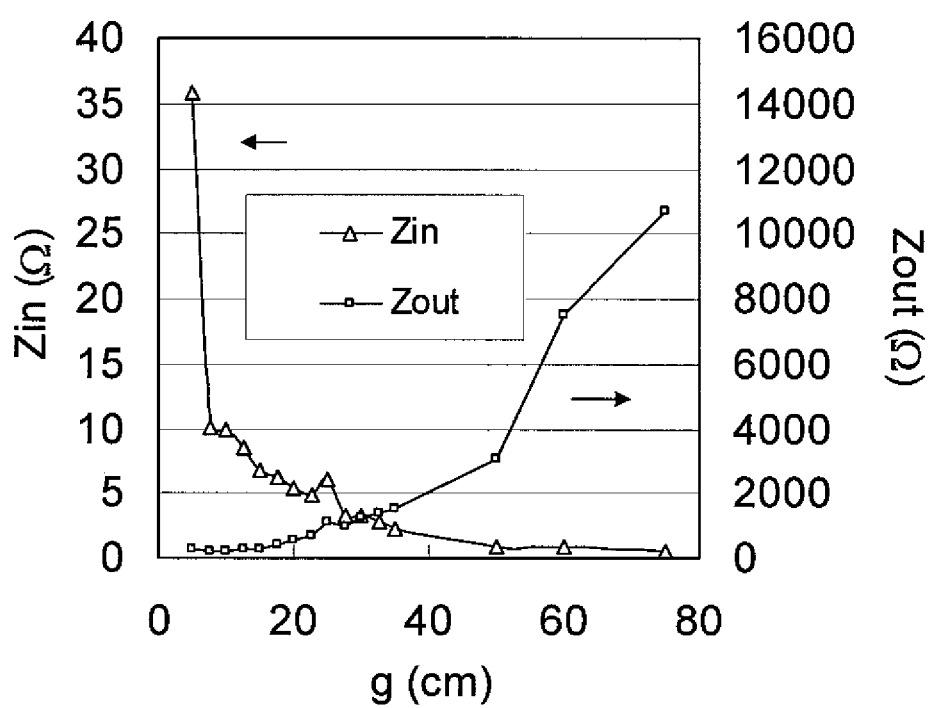
FIG. 24 is a graph showing the dependences of the input and output impedances Zin and Zout of the wireless transmission section on the antenna-to-antenna gap in a specific example of the present invention.

FIG. 24 is a graph showing the g dependences of Zin and Zout derived. On the other hand, FIG. 25 is a graph showing the g dependences of the input/output impedance conversion ratio Zr and the transfer efficiency of the wireless transmission section.

The present inventors discovered that the Zr value was more than one through the entire range of the gap g and that the greater the gap g, the more steeply Zr increased. More specifically, when g=5 cm, Zr was 7.7. When g=7.5 cm, Zr was 20.6. And when g=75 cm, Zr was as large as 23158.

Also, when g=5 mm, the coupling coefficient k between the resonators was 0.376, which is just 4% greater than the k value of 0.361 to be derived for only the wireless transmission section by substituting Voc=1 for Equation (14). These results demonstrated the validity of Equation (14).

Figure 25:
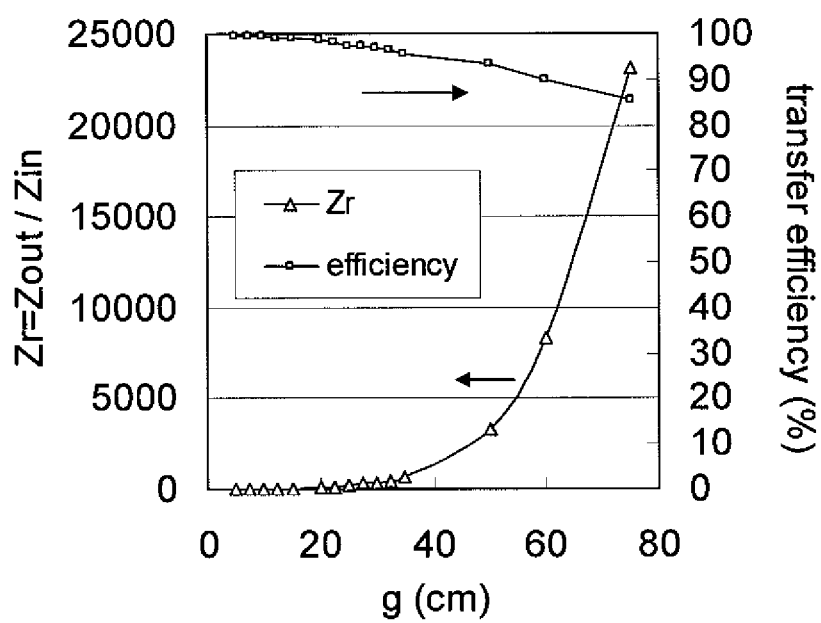
FIG. 25 is a graph showing how the input/output impedance conversion ratio Zr and the wireless transfer efficiency of the wireless transmission section depend on the antenna-to-antenna gap in a specific example of the present invention.
Figure 26:
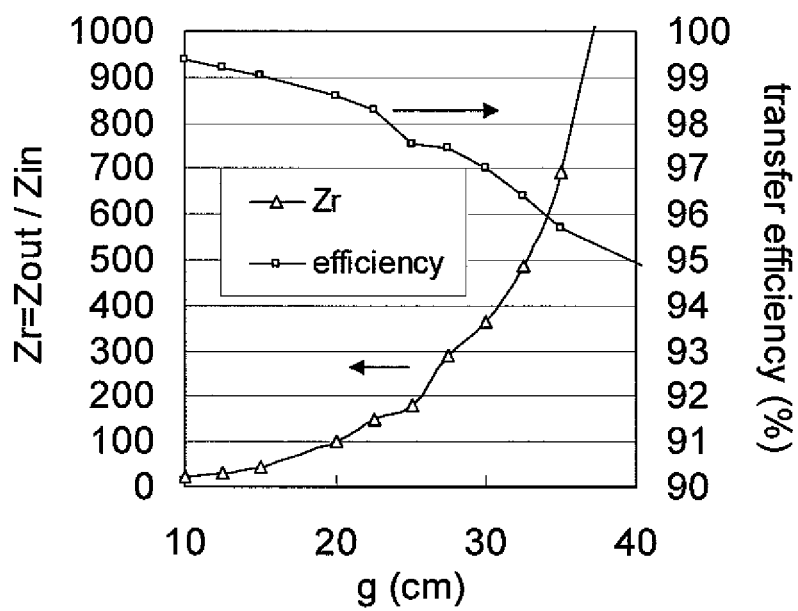
FIG. 26 is a graph showing how the input/output impedance conversion ratio Zr and the wireless transfer efficiency of the wireless transmission section depended on the antenna-to-antenna gap in a first specific example of the present invention.

FIG. 26 is a graph showing a part of the graph of FIG. 25, where 10 cm≤g≤40 cm, on a larger scale. The wall of a normal building has a thickness of approximately 10 to 30 cm. And if the gap g fell within that range, Zr was as large as 20 to 363. To get a high Zr value of 147, which was obtained when g=22.5, achieved by a transformer, the ratio of the number of turns of secondary coil to that of primary coil should be set to be 12.1. In a specific example of the present invention, Zr could be increased to 147 while using the power transmitting and power receiving antennas that had a number of turns ratio of one.

The forward pass characteristic to be obtained by matching the input and output terminal impedances to the input and output impedances Zin and Zout derived by the method described above corresponds to the wireless transfer efficiency in each power generating unit of the power generator of the present invention. As shown in FIG. 26, even when g=22.5 cm, a wireless transfer efficiency of as high as 98.3% could also be achieved.

According to the first specific example of the present invention, by connecting the oscillator described above to the wireless transmission section, RF output could be obtained with an efficiency of as high as 93.1% from the input DC voltage. The voltage step-up ratio of the output RF effective voltage with respect to the input DC voltage was 12.7. Only a part of the input power would have changed into heat due to the loss that had been caused by slight mismatch between the circuit blocks.

Next, two power generating units, each having the same configuration as Example 1 described above, were provided and their outputs were connected in parallel with each other. Specifically, those two power generating units were arranged in parallel with each other by translating those two units so that the distance between the respective centers of mass of the two power transmitting antennas and the distance between the respective centers of mass of the two power receiving antennas both became 50 cm. The energies that had been received by the two power receiving antennas were combined together in parallel.

In Example 1a of the present invention, measurements were carried out with the phase difference between the respective outputs of the two oscillators changed from 90 degrees through 180 degrees on a 30 degree a time basis to obtain Examples 1a-90, 1a-120, 1a-150 and 1a-180, respectively. On the other hand, in Comparative Example 1, the phase difference between the respective outputs of the two oscillators was changed from 0 degrees through 60 degrees to obtain Comparative Examples 1-0, 1-30, and 1-60, respectively. In the two power generating units, the wires of the respective power transmitting inductors were formed by turning them in the same direction. In Example 1a and Comparative Example 1, it was calculated, as an index for estimating the leaking electromagnetic field, how high the near field strength would be at a point 5 m away from the current position.

Comparative Examples a to c

As in Example 1 described above, two power generators, of which the wireless transmission section also included resonators with a resonant frequency of 3 MHz at both the transmitting and receiving ends, were made as Comparative Examples a and b. The only difference between Example 1 and Comparative Examples a and b was that the two antennas (or resonators) of Comparative Examples a and b were of the same resonance type. More specifically, in Comparative Example a, the two antennas thereof were both LC series resonant circuits. On the other hand, in Comparative Example b, the two antennas thereof were both LC parallel resonant circuits. The circuit constants of each of these resonators were the same as those of Example 1. Meanwhile, Comparative Example c, which was designed so that no resonance would be produced between the two antennas, was also made. It should be noted that in Comparative Examples a to c, the voltage increase effect and the high efficiency operation could not be achieved at the same time, and therefore, the two power generating units did not operate in parallel with each other and the strength of the near field was not measured, either.

The following Table 1 summarizes the structures of the resonators of Example 1 and Comparative Examples a to c, and also shows the wireless transmission section characteristic when g=22.5 cm.

TABLE 1

| | Resonator at transmitting end | Resonator at receiving end | Zin (Ω) | Zout (Ω) | Vr | Zr | Wireless transfer efficiency (%) |
|---|---|---|---|---|---|---|---|
| Ex. 1 | Series resonance | Parallel resonance | 4.92 | 725 | 12.1 | 147 | 98.3 |
| Cmp. Ex. a | Series resonance | Series resonance | 6.4 | 6.4 | 1 | 1 | 98.6 |
| Cmp. Ex. b | Parallel resonance | Parallel resonance | 635 | 635 | 1 | 1 | 98.6 |
| Cmp. Ex. c | No resonance | No resonance | 60 | 60 | 1 | 1 | 1.1 |

As can be seen easily from Table 1, in Example 1, a very high voltage step-up ratio Vr could be achieved with high-efficiency power transmission realized wirelessly.

On the other hand, the following Table 2 shows the near field strengths of Examples 1a and Comparative Examples 1. The near field strengths were measured in every solid angle direction at a step of 10 degrees. And the value shown in the following Table 2 was the worst one in all of those directions.

TABLE 2

| | θt (degrees) | θres (degrees) | Near field strength (mV/m) |
|---|---|---|---|
| Comparative Example 1-0 | 0 | 0 | 3.11 |
| Comparative Example 1-30 | 30 | 30 | 2.91 |
| Comparative Example 1-60 | 60 | 60 | 2.54 |
| Example 1a-90 | 90 | 90 | 2.06 |
| Example 1a-120 | 120 | 120 | 1.51 |
| Example 1a-150 | 150 | 150 | 1.01 |
| Example 1a-180 | 180 | 180 | 0.92 |

As can be seen easily from Table 2, these results prove that the arrangement of the present invention in which θres was within the range of 90 to 180 degrees not only achieved a very high voltage step up ratio Vr while transmitting power wirelessly with high efficiency but also minimized leakage of electromagnetic waves into the surrounding space effectively.

Example 2

As a second specific example of the present invention, a power generating unit was made by connecting a voltage doubler rectifier circuit to the output of the power receiving antenna with the arrangement of Example 1. The half-wave voltage doubler rectifier circuit thus obtained achieved a DC conversion efficiency of as high as 93.4% at a resonant frequency of 3 MHz. The rectifier thus introduced realized a voltage boosting function with a voltage step-up ratio Vrr of two, at which the output DC voltage would be twice as high as the input RF voltage. And with respect to the output energy of the solar power generating section, the output DC energy provided by the power generating unit of this example still had an intensity of 86.4%.

Next, two power generating units, each having the same configuration as Example 2 described above, were provided and their outputs were connected in parallel with each other. Specifically, those two power generating units were arranged in parallel with each other by translating those two units so that the distance between the respective centers of mass of the two power transmitting antennas and the distance between the respective centers of mass of the two power receiving antennas both became 50 cm. The energies that had been received by the two power receiving antennas were rectified by the rectifier circuit and then combined together in parallel.

In Example 2a of the present invention, measurements were carried out with the phase difference between the respective outputs of the two oscillators set to be 180 degrees. On the other hand, in Comparative Example 2, the phase difference between the respective outputs of the two oscillators was set to be zero degrees. In the two power generating units, the wires of the respective power transmitting inductors were formed by turning them in the same direction. The near field strength was measured in every solid angle direction at a step of 10 degrees. As a result, the worst value of Example 2a was lower by 65% than that of Comparative Example 2.

Example 3

As a third specific example of the present invention, a power generating unit was made by connecting a bridge rectifier to the output of the power receiving antenna with the arrangement of Example 1. The bridge rectifier thus obtained achieved a DC conversion efficiency of as high as 94.1% at a resonant frequency of 3 MHz. With such a rectifier introduced, the output DC energy provided by the power generator of this example had an intensity of 87.0% with respect to the output energy of the solar power generating section.

Next, two power generating units, each having the same configuration as Example 3 described above, were provided and their outputs were connected in parallel with each other. Specifically, those two power generating units were arranged in parallel with each other by translating those two units so that the distance between the respective centers of mass of the two power transmitting antennas and the distance between the respective centers of mass of the two power receiving antennas both became 50 cm. The energies that had been received by the two power receiving antennas were rectified by the rectifier circuit and then combined together in parallel.

In Example 3a of the present invention, measurements were carried out with the phase difference between the respective outputs of the two oscillators set to be 180 degrees. On the other hand, in Comparative Example 3, the phase difference between the respective outputs of the two oscillators was set to be zero degrees. In the two power generating units, the wires of the respective power transmitting inductors were formed by turning them in the same direction. The near field strength was measured in every solid angle direction at a step of 10 degrees. As a result, the worst value of Example 3a was lower by 66% than that of Comparative Example 3.

Example 4

With the conditions of Example 3 partially modified, a power generating unit representing a fourth specific example of the present invention was made under the conditions including Voc=1.52 and g=15 cm. The power generating unit of Example 4 achieved an output voltage of 308 V and a power generation efficiency of 87.2%.

Next, two power generating units, each having the same configuration as Example 4 described above, were provided and their outputs were connected in parallel with each other. Specifically, those two power generating units were arranged in parallel with each other by translating those two units so that the distance between the respective centers of mass of the two power transmitting antennas and the distance between the respective centers of mass of the two power receiving antennas both became 50 cm. The energies that had been received by the two power receiving antennas were rectified by the rectifier circuit and then combined together in parallel.

In Example 4a of the present invention, measurements were carried out with the phase difference between the respective outputs of the two oscillators set to be 180 degrees. On the other hand, in Comparative Example 4, the phase difference between the respective outputs of the two oscillators was set to be zero degrees. In the two power generating units, the wires of the respective power transmitting inductors were formed by turning them in the same direction. The near field strength was measured in every solid angle direction at a step of 10 degrees. As a result, the worst value of Example 4a was lower by 63% than that of Comparative Example 4.

Example 5

A power generator was formed as a fifth specific example of the present invention by arranging seven power generating units of Example 4 in line and connecting them in parallel with each other, thereby achieving an output voltage of 308 V and a generated power of 27.5 W. In the same way, a power generator was formed as Comparative Example 5 by connecting 63 solar cells in series together. The following Table 3 summarizes the characteristics of Example 5 and Comparative Example 5:

TABLE 3

| | Total number of cells used | Number of cells connected in parallel | Number of cells connected in series | Output voltage (V) | Generated power (W) |
|---|---|---|---|---|---|
| Ex. 5 | 63 | 7 | 9 | 308 | 27.5 |
| Cmp. Ex. 5 | 63 | 1 | 63 | 31.5 | 31.1 |

Although the number of cells that were connected in series was much smaller than in Comparative Example 5, Example 5 achieved 9.8 times as high an output voltage as Comparative Example 5. Consequently, this Example 5 realizes a power generator that provides the best voltage value for a DC power supply system with a working voltage of 300 V.

In Example 5, the oscillation phase was controlled so that θres=180 degrees was satisfied by three adjacent ones of the power generating units of Example 4 that were arranged in parallel with each other. The distance between the respective centers of mass of two adjacent power transmitting antennas and the distance between the respective centers of mass of two adjacent power receiving antennas were both 50 cm.

On the other hand, Comparative Example 5a includes as many solar cells as Example 5 but has only one set of oscillator, power transmitting antenna, power receiving antenna and rectifier in the system. In Example 5, the wires of the respective power transmitting inductors of all power generating units were formed by turning them in the same direction. The near field strength was measured in every solid angle direction at a step of 10 degrees. As a result, the worst value of Example 5 was lower by 78% than that of Comparative Example 5a.

The present invention can reduce the installation cost of a power generator and can simplify the replacement work if a part of its power generating section has deteriorated. In addition, according to the present invention, the output voltage of the power generating section can be increased easily. That is why if the power generating section needs to be formed by connecting power generating elements (or cells) with a low output voltage in series together, the number of those power generating elements to be connected can be reduced significantly. As a result, a solar power generator, of which the performance would be affected by partial shading to a much lesser degree and which can supply power with good stability, is provided. In addition, the electromagnetic components leaking from the wireless power transmitting section can be reduced. On top of that, the voltage increase produced by the present invention will also result in many beneficial effects in a fuel cell system, which is a power generator that should function as a link to pass the output energy supplied from a power generating device at a low voltage to a system with a high working voltage.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A wireless power transmission unit comprising:
first and second wireless power transmitting sections, each of the first and second wireless power transmitting sections including
an oscillator that converts DC energy into RE energy having a frequency f0,
a power transmitting antenna that transmits the RF energy and includes a first inductor and a first capacitor connected together in series to form a series resonant circuit with a resonant frequency fT, and
a power receiving antenna that receives at least a part of the RF energy transmitted by the power transmitting antenna by coupling a resonant magnetic field and includes a second inductor and a second capacitor connected in parallel with each other to form a parallel resonant circuit with a resonant frequency fR,
wherein the resonant frequencies fT and fR are set to be substantially equal to the frequency f0 of the RF energy, and
wherein if the oscillator has a voltage step-up ratio Voc, the first inductor has an inductance L1, the second inductor has an inductance L2, and the power transmitting and power receiving antennas have a coupling coefficient k, the first and second wireless power transmitting sections satisfy $(L2/L1) \geq 4(k/Voc)^2$;
a combining section that combines together RF energies supplied from the respective power receiving antennas of the first and second wireless power transmitting sections and outputs the combined RE energy; and
a control section that controls the respective oscillators of the first and second wireless power transmitting sections such that the respective phases of the resonant magnetic fields of the first and second wireless power transmitting sections have a phase difference $\theta res$ of 90 to 180 degrees therebetween.

2. The wireless power transmission unit of claim 1, wherein the phase difference $\theta res$ is set to be 180 degrees.

3. The wireless power transmission unit of claim 1, wherein the control section controls the respective phases $\theta ta$ and $\theta tb$ of RF energies that have been transmitted from the respective oscillators of the first and second wireless power transmitting sections, thereby setting the absolute value of the phase difference $\theta t$ between the phases $\theta ta$ and $\theta tb$ to be 90 to 180 degrees therebetween.

4. The wireless power transmission unit of claim 3, wherein the absolute value of the phase difference $\theta t$ is set to be 180 degrees.

5. A power generator comprising:
first and second power generating units, each of the first and second power generating units including
a power generating section that outputs DC energy,
an oscillator that converts the DC energy supplied from the power generating section into RF energy having a frequency f0,
a power transmitting antenna that transmits the RF energy and includes a first inductor and a first capacitor connected together in series to form a series resonant circuit with a resonant frequency fT, and
a power receiving antenna that receives at least a part of the RF energy transmitted by the power transmitting antenna by coupling a resonant magnetic field and includes a second inductor and a second capacitor connected in parallel with each other to form a parallel resonant circuit with a resonant frequency fR,
wherein the resonant frequencies fT and fR are set to be substantially equal to the frequency f0 of the RF energy, and
wherein if the oscillator has a voltage step-up ratio Voc, the first inductor has an inductance L1, the second inductor has an inductance L2, and the power transmitting and power receiving antennas have a coupling coefficient k, the first and second power generating units satisfy $(L2/L1) \geq 4(k/Voc)^2$;
a combining section that combines together RF energies supplied from the respective power receiving antennas of the first and second power generating units and outputs the combined RF energy; and
a control section that controls the respective oscillators of the first and second power generating units such that the respective phases of the resonant magnetic fields of the first and second power generating units have a phase difference $\theta res$ of 90 to 180 degrees therebetween.

6. The power generator of claim 3, wherein the power generating section is a solar power generating section.

7. The power generator of claim 3, wherein the solar power generating section uses crystalline silicon.

8. The power generator of claim 5, wherein when an output terminal of the power receiving antenna is connected to a load that follows the power receiving antenna, the output impedance Zoc of the oscillator is substantially equal to the input impedance Zin of the power transmitting antenna.

9. The power generator of claim 5, wherein when an output terminal of the oscillator is connected to an input terminal of the power transmitting antenna, the output impedance Zout of the power receiving antenna is substantially equal to the input impedance of a load that follows the power receiving antenna.

10. The power generator of claim 5, wherein $(L2/L1) \geq 100 \times (k/Voc)^2$ is satisfied.

11. The power generator of claim 5, wherein $(L2/L1) \geq 10000 \times (k/Voc)^2$ is satisfied.

12. The power generator of claim 5, wherein the power generating section and the power transmitting antenna are arranged outside of a building, and
wherein the power receiving antenna is installed inside of the building.

13. The power generator of claim 5, wherein the first and second inductors both have an air-core spiral structure.

14. The power generator of claim 5, wherein $L1 < L2$ is satisfied.

15. The power generator of claim 5, wherein the number N2 of turns of the second inductor is greater than the number N1 of turns of the first inductor.

16. The power generator of claim 5, wherein the second inductor is larger in area than the first inductor.

17. The power generator of claim 16, wherein when the first and second inductors are projected onto the power transmitting antenna's arrangement plane, the first inductor is included within, and located close to the periphery of, the area defined by the projected profile of the second inductor.

18. The power generator of claim 16, wherein when the first and second inductors are projected onto the power transmitting antenna's arrangement plane, the first inductor is located close to the periphery of the area defined by the projected profile of the second inductor.

19. The power generator of claim 5, wherein a phase control section that matches the phases of RF energies supplied from the respective power receiving antennas of the first and second power generating units is arranged between the power receiving antenna and the combining section in each of the first and second power generating units.

20. The power generator of claim 5, wherein the phase difference is 180 degrees, and
wherein in order to match the phases of RF energies supplied from the respective power receiving antennas of the first and second power generating units, the polarity of connection between the power receiving antenna and the combining section in the first power generating unit is inverse of the polarity of connection in the second power generating unit.

21. The power generator of claim 5, comprising a frequency converting circuit, which converts the RF energy supplied from the combining section into alternating current or direct current that has a lower frequency than the RF energy.

22. The power generator of claim 5, wherein each of the first and second power generating units comprises a frequency converting circuit, which converts the RF energy supplied from the power receiving antenna into alternating current or direct current that has a lower frequency than the RF energy.

23. The power generator of claim 5, wherein the combining section is connected to a utility grid.

24. A power generator comprising:
first and second power generating units, each of the first and second power generating units including
a power generating section that outputs DC energy,
an oscillator that converts the DC energy supplied from the power generating section into RF energy having a frequency f0,
a power transmitting antenna that transmits the RF energy and includes a first inductor and a first capacitor connected together in series to form a series resonant circuit with a resonant frequency fT,
a power receiving antenna that receives at least a part of the RE energy transmitted by the power transmitting antenna by coupling a resonant magnetic field and includes a second inductor and a second capacitor connected in parallel with each other to form a parallel resonant circuit with a resonant frequency fR, and
a rectifier that converts the RF energy supplied from the power receiving antenna into DC energy
wherein the resonant frequencies fT and fR are set to be substantially equal to the frequency f0 of the RF energy, and
wherein if the oscillator has a voltage step-up ratio Voc, the rectifier has a voltage step-up ratio Vrr, the first inductor has an inductance L1, the second inductor has an inductance L2, and the power transmitting and power receiving antennas have a coupling coefficient k, the first and second power generating units satisfy $(L2/L1) \geq 4(k/(Voc \times Vrr))^2$;

an output section that combines RF energies received from the respective power transmitting antennas of the first and second power generating units and outputs the combined RF energy; and
a control section that controls the respective oscillators of the first and second power generating units such that the respective phases of the resonant magnetic fields of the first and second power generating units have a phase difference θres of 90 to 180 degrees therebetween.

25. The power generator of claim 24, wherein the power generating section is a solar power generating section.

26. The power generator of claim 24, wherein when an output terminal of the rectifier is connected to a load that follows the rectifier, the output impedance Zoc of the oscillator is substantially equal to the input impedance Zin of the power transmitting antenna.

27. The power generator of claim 24, wherein when an output terminal of the oscillator is connected to an input terminal of the power transmitting antenna, the output impedance Zout of the rectifier is substantially equal to the input impedance of a load that follows the rectifier.

28. The power generator of claim 24, wherein $(L2/L1) \geq 100 \times (k/(Voc \times Vrr))^2$ is satisfied.

29. The power generator of claim 24, wherein $(L2/L1) \geq 2304 \times (k/Voc)^2$ is satisfied.

30. The power generator of claim 24, wherein $(L2/L1) \geq 10000 \times (k/Voc)^2$ is satisfied.

31. The power generator of claim 24, wherein the rectifier is a voltage doubler rectifier circuit with a voltage step-up ratio Vrr of at least two.

32. A power generator comprising
N power generating units, where N is an integer that is equal to or greater than four, and
a combining section that combines together the respective outputs of the power generating units in parallel with each other,
wherein each said power generating unit comprises:
a power generating section that outputs DC energy;
an oscillator that converts the DC energy supplied from the power generating section into RF energy having a frequency f0;
a power transmitting antenna that transmits the RF energy and includes a first inductor and a first capacitor connected together in series to form a series resonant circuit with a resonant frequency fT; and
a power receiving antenna that receives at least a part of the RF energy transmitted by the power transmitting antenna by coupling a resonant magnetic field and that includes a second inductor and a second capacitor connected in parallel with each other to form a parallel resonant circuit with a resonant frequency fR,
wherein the resonant frequencies fT and fR are set to be substantially equal to the frequency f0 of the RF energy, and
wherein if the oscillator has a voltage step-up ratio Voc, the first inductor has an inductance L1, the second inductor has an inductance L2, and the power transmitting and power receiving antennas have a coupling coefficient k, the power generating unit satisfies $(L2/L1) \geq 4(k/Voc)^2$, and
wherein the power generator further includes a control section, which controls the respective oscillators of the power generating units such that the resonant magnetic field in one of two proximate ones of the N power generating units has a phase difference $\theta$res of 90 to 180 degrees from the resonant magnetic field in the other power generating unit.

* * * * *